United States Patent
Liu et al.

(10) Patent No.: US 11,263,426 B2
(45) Date of Patent: Mar. 1, 2022

(54) FINGERPRINT IDENTIFICATION DEVICE AND DRIVING METHOD THEREOF, DISPLAY DEVICE

(71) Applicant: BOE TECHNOLOGY GROUP CO., LTD., Beijing (CN)

(72) Inventors: Yingming Liu, Beijing (CN); Haisheng Wang, Beijing (CN); Xiaoliang Ding, Beijing (CN); Lei Wang, Beijing (CN); Pengpeng Wang, Beijing (CN); Changfeng Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/264,328

(22) PCT Filed: Jun. 18, 2020

(86) PCT No.: PCT/CN2020/096769
§ 371 (c)(1),
(2) Date: Jan. 29, 2021

(87) PCT Pub. No.: WO2020/259384
PCT Pub. Date: Dec. 30, 2020

(65) Prior Publication Data
US 2021/0303814 A1    Sep. 30, 2021

(30) Foreign Application Priority Data
Jun. 25, 2019   (CN) .......................... 201910554122.8

(51) Int. Cl.
*G06K 9/00*    (2006.01)

(52) U.S. Cl.
CPC ....... *G06K 9/0002* (2013.01); *G06K 9/00067* (2013.01)

(58) Field of Classification Search
CPC ........ G06K 9/00006–0012; G06K 2009/0006; G06F 3/043–0436; G06F 3/0416–04186
See application file for complete search history.

(56) References Cited

U.S. PATENT DOCUMENTS

| 9,977,943 B2 | 5/2018 | Lee et al. |
| 11,120,243 B2 * | 9/2021 | Liu ...................... G06K 9/0002 |

(Continued)

FOREIGN PATENT DOCUMENTS

| CN | 107180218 A | 9/2017 |
| CN | 107194384 A | 9/2017 |

(Continued)

*Primary Examiner* — Patrick F Marinelli
(74) *Attorney, Agent, or Firm* — Chiwin Law LLC

(57) ABSTRACT

A fingerprint identification device, a driving method thereof, and a display device are disclosed. The fingerprint identification device includes: a receiving electrode layer, a piezoelectric material layer, and a drive electrode layer. The piezoelectric material layer is between the receiving electrode layer and the drive electrode layer, the piezoelectric material layer is configured to emit ultrasonic waves under an excitation of at least a drive voltage, and is further configured to convert ultrasonic waves, which are emitted by the piezoelectric material layer and reflected by a fingerprint to be detected, into electrical signals; the drive electrode layer is configured to receive the drive voltage and a first fixed voltage simultaneously, and the receiving electrode layer is configured to output the electrical signals while receiving a second fixed voltage; the electrical signals are used for obtaining a fingerprint image.

20 Claims, 7 Drawing Sheets

(56) References Cited

U.S. PATENT DOCUMENTS

| | | | |
|---|---|---|---|
| 2014/0225873 A1* | 8/2014 | Small | G06F 3/0436 |
| | | | 345/177 |
| 2016/0306481 A1* | 10/2016 | Filiz | G01L 1/146 |
| 2017/0110504 A1* | 4/2017 | Panchawagh | H01L 41/311 |
| 2017/0285877 A1* | 10/2017 | Hinger | H03K 17/74 |
| 2018/0035923 A1* | 2/2018 | Kang | G06K 9/0002 |
| 2018/0310921 A1* | 11/2018 | Wadhwa | G06K 9/0002 |
| 2019/0122018 A1 | 4/2019 | Kho et al. | |
| 2020/0147643 A1* | 5/2020 | Sam | G06F 1/3262 |
| 2020/0171541 A1* | 6/2020 | Campanella Pineda | |
| | | | H01L 27/20 |
| 2020/0193118 A1 | 6/2020 | Ding et al. | |
| 2020/0242316 A1* | 7/2020 | Liu | G06K 9/0002 |
| 2020/0287126 A1* | 9/2020 | Chang | H01L 41/29 |
| 2020/0293736 A1* | 9/2020 | Liu | H01L 27/323 |
| 2020/0410193 A1* | 12/2020 | Wu | G06F 3/0416 |
| 2021/0019018 A1* | 1/2021 | Guo | H01L 41/083 |
| 2021/0158005 A1* | 5/2021 | Liu | H01L 41/1132 |
| 2021/0165524 A1* | 6/2021 | Liu | G06K 9/00 |
| 2021/0200985 A1* | 7/2021 | Liu | H01L 41/0477 |
| 2021/0209334 A1* | 7/2021 | Liu | G06F 3/04164 |
| 2021/0216734 A1* | 7/2021 | Liu | G06F 3/147 |
| 2021/0216735 A1* | 7/2021 | Guo | G06F 21/84 |
| 2021/0264126 A1* | 8/2021 | Yang | G06F 3/0412 |

FOREIGN PATENT DOCUMENTS

| | | |
|---|---|---|
| CN | 107220630 A | 9/2017 |
| CN | 108537179 A | 9/2018 |
| CN | 109829419 A | 5/2019 |
| CN | 110287871 A | 9/2019 |
| EP | 3637304 A1 | 4/2020 |

* cited by examiner

FINGERPRINT IDENTIFICATION DEVICE AND DRIVING METHOD THEREOF, DISPLAY DEVICE

CROSS REFERENCE TO RELATED APPLICATIONS

This application is a U.S. National Phase Entry of International Application No. PCT/CN2020/096769 filed on Jun. 18, 2020, designating the United States of America and claiming priority to Chinese Patent Application No. 201910554122.8, filed on Jun. 25, 2019. The present application claims priority to and the benefit of the above-identified applications and the above-identified applications are incorporated by reference herein in their entirety.

TECHNICAL FIELD

Embodiments of the present disclosure relate to a fingerprint identification device, a driving method thereof, and a display device.

BACKGROUND

In recent years, with the development of science and technology, electronic products with biometric feature recognition function have gradually entered people's life and work. Fingerprint is an inborn, unique and invariable feature, which can be distinguished from others, of human body, and includes ridges and valleys on the skin surface of the fingertip. Because of the uniqueness and invariance of the fingerprint, the fingerprint can be used for personal identification, so people pay more attention to the fingerprint identification technology.

At present, fingerprint identification can be implemented by optical, capacitive and ultrasonic imaging technologies, mainly. Because the identification implemented by ultrasonic sensors is safer due to three dimensional features of the fingerprint can be obtained, ultrasonic sensors can achieve better user experience, better design, and relatively low cost, ultrasonic sensors have become a hot research direction of major manufacturers.

SUMMARY

At least one embodiment of the present disclosure provides a fingerprint identification device, which comprises: a receiving electrode layer, a piezoelectric material layer, and a drive electrode layer. The piezoelectric material layer is between the receiving electrode layer and the drive electrode layer; the piezoelectric material layer is configured to emit ultrasonic waves under an excitation of at least a drive voltage, and is further configured to convert ultrasonic waves, which are emitted by the piezoelectric material layer and reflected by a fingerprint to be detected, into electrical signals; the drive electrode layer is configured to receive the drive voltage and a first fixed voltage simultaneously, and the receiving electrode layer is configured to output the electrical signals while receiving a second fixed voltage; the electrical signals are used for obtaining a fingerprint image; the drive electrode layer comprises a plurality of drive electrodes spaced apart from each other; the receiving electrode layer comprises a plurality of receiving electrodes spaced apart from each other; a first part of the plurality of drive electrodes in the drive electrode layer is configured to receive the drive voltage in operation; a second part of the plurality of drive electrodes in the drive electrode layer is configured to receive the first fixed voltage in operation; receiving electrodes that are opposite to the first part of the plurality of drive electrodes are configured to receive the second fixed voltage in operation; regions of the piezoelectric material layer that are opposite to the first part of the plurality of drive electrodes are configured to emit the ultrasonic waves under the excitation of at least the drive voltage in operation; and regions of the piezoelectric material layer that are opposite to the second part of the plurality of drive electrodes are configured to convert the ultrasonic waves, which are emitted by the regions of the piezoelectric material layer that are opposite to the first part of the plurality of drive electrodes and reflected by the fingerprint to be detected, into the electrical signals in operation.

For example, in at least one example of the fingerprint identification device, a difference between the drive voltage and the second fixed voltage is configured to change along with time.

For example, in at least one example of the fingerprint identification device, the fingerprint identification device further comprises a driving circuit, a signal readout circuit, and a processor. The driving circuit is configured to be connected to the drive electrode layer electrically so as to apply the drive voltage to the first part of the plurality of drive electrodes in the drive electrode layer and apply the first fixed voltage to the second part of the plurality of drive electrodes in the drive electrode layer; the signal readout circuit is configured to be connected to the receiving electrode layer electrically so as to apply the second fixed voltage to the receiving electrodes that are opposite to the first part of the plurality of drive electrodes and acquire the electrical signals from the receiving electrodes that are opposite to the second part of the plurality of drive electrodes; the driving circuit and the signal readout circuit are jointly configured to enable the difference between the drive voltage and the second fixed voltage to change along with time; and the processor is configured to obtain the fingerprint image according to the electrical signals.

For example, in at least one example of the fingerprint identification device, the processor comprises the driving circuit, and the driving circuit comprises the signal readout circuit.

For example, in at least one example of the fingerprint identification device, the plurality of receiving electrodes in the receiving electrode layer are arranged in M rows and N columns, and M and N are positive integers greater than 1; the plurality of receiving electrodes comprise first receiving electrodes and second receiving electrodes; receiving electrodes in odd columns are the first receiving electrodes, and receiving electrodes in even columns are the second receiving electrodes; and the driving circuit and the signal readout circuit are jointly configured to apply the second fixed voltage to all the second receiving electrodes while acquiring the electrical signals output by all the first receiving electrodes, or to apply the second fixed voltage to all the first receiving electrodes while acquiring the electrical signals output by all the second receiving electrodes.

For example, in at least one example of the fingerprint identification device, the plurality of drive electrodes in the drive electrode layer are arranged in one row and N columns; the plurality of drive electrodes comprise first drive electrodes and second drive electrodes; each drive electrode in the plurality of drive electrodes is a strip-shaped electrode; and drive electrodes in odd columns are the first drive electrodes, and receiving electrodes in even columns are the second drive electrodes.

For example, in at least one example of the fingerprint identification device, an orthographic projection of an i-th column of drive electrode on the piezoelectric material layer covers an orthographic projection of an i-th column of receiving electrodes on the piezoelectric material layer, and $1 \leq i \leq N$.

For example, in at least one example of the fingerprint identification device, the plurality of drive electrodes in the drive electrode layer are in M rows and N columns; the plurality of drive electrodes comprise first drive electrodes and second drive electrodes; and drive electrodes in odd columns are the first drive electrodes, and drive electrodes in even columns are the second drive electrodes.

For example, in at least one example of the fingerprint identification device, all the first drive electrodes are connected to each other, and all the second drive electrodes are connected to each other.

For example, in at least one example of the fingerprint identification device, an orthographic projection of a drive electrode in an i-th row and a j-th column on the piezoelectric material layer covers an orthographic projection of a receiving electrode in an i-th row and a j-th column on the piezoelectric material layer, and $1 \leq i \leq M$ and $1 \leq j \leq N$.

For example, in at least one example of the fingerprint identification device, the driving circuit is further configured to apply the first fixed voltage to all the second drive electrodes while applying the drive voltage to all the first drive electrodes, or to apply the first fixed voltage to all the first drive electrodes while applying the drive voltage to all the second drive electrodes; and the signal readout circuit is further configured to apply the second fixed voltage to all the first receiving electrodes in a case where the driving circuit is further configured to apply the drive voltage to all the first drive electrodes, and the signal readout circuit is further configured to apply the second fixed voltage to all the second receiving electrodes in a case where the driving circuit is further configured to apply the drive voltage to all the second drive electrodes.

For example, in at least one example of the fingerprint identification device, the fingerprint identification device further comprises a substrate. The substrate is at a side of the receiving electrode layer away from the piezoelectric material layer; the substrate comprises a base layer and a plurality of signal readout circuits; the base layer is at a side of the plurality of signal readout circuits away from the plurality of receiving electrodes; and the plurality of signal readout circuits are respectively connected to the plurality of receiving electrodes in the receiving electrode layer, electrically.

At least one embodiment of the present disclosure provides another fingerprint identification device, which comprises: a plurality of fingerprint identification units. The plurality of fingerprint identification unit comprise a first part and a second part which are not overlapped in a direction perpendicular to the fingerprint identification device; the first part of the plurality of fingerprint identification units is configured to emit ultrasonic waves in a first time period; the second part of the plurality of fingerprint identification units is configured to convert ultrasonic waves, which are emitted by the first part of the plurality of fingerprint identification units and reflected by a fingerprint to be detected, into electrical signals in the first time period; the second part of the plurality of fingerprint identification units is configured to emit the ultrasonic waves in a second time period that does not overlap with the first time period in time; and the first part of the plurality of fingerprint identification units is configured to convert ultrasonic waves, which are emitted by the second part of the plurality of fingerprint identification units and reflected by the fingerprint to be detected, into the electrical signals in the second time period.

For example, in at least one example of another fingerprint identification device, each of the plurality of fingerprint identification units comprises a first electrode, a second electrode, and a piezoelectric material sandwiched between the first electrode and the second electrode; first electrodes in the first part of the plurality of fingerprint identification units are configured to receive a drive voltage in the first time period; first electrodes in the second part of the plurality of fingerprint identification units are configured to receive a first fixed voltage in the first time period; second electrodes in the first part of the plurality of fingerprint identification units are configured to receive a second fixed voltage in the first time period; second electrodes in the second part of the plurality of fingerprint identification units are configured to output the electrical signals in the first time period; the first electrodes in the first part of the plurality of fingerprint identification units are configured to receive the first fixed voltage in the second time period; the first electrodes in the second part of the plurality of fingerprint identification units are configured to receive the drive voltage in the second time period; the second electrodes in the first part of the plurality of fingerprint identification units are configured to output the electrical signals in the second time period; the second electrodes in the second part of the plurality of fingerprint identification units are configured to receive the second fixed voltage during the second time period; and a difference between the drive voltage and the second fixed voltage changes along with time.

For example, in at least one example of another fingerprint identification device, the first electrodes in the first part of the plurality of fingerprint identification units and the first electrodes in the second part of the plurality of fingerprint identification units are in a same electrode layer, and are spaced apart and electrically insulated from each other; and the second electrodes in the first part of the plurality of fingerprint identification units and the second electrodes in the second part of the plurality of fingerprint identification units are in a same electrode layer, and are spaced apart and electrically insulated from each other.

For example, in at least one example of another fingerprint identification device, the first electrodes in the first part of the plurality of fingerprint identification units and the second electrodes in the second part of the plurality of fingerprint identification units are in a same electrode layer, and are spaced apart and electrically insulated from each other; and the first electrodes in the second part of the plurality of fingerprint identification units and the second electrodes in the first part of the plurality of fingerprint identification units are in a same electrode layer and are electrically connected or electrically insulated from each other.

At least one embodiment of the present disclosure further provides a display device, which comprises: the fingerprint identification device provided by any embodiment of the present disclosure, and a display panel. The display panel and the fingerprint identification device are stacked in a direction perpendicular to the display device.

For example, in at least one example of the display device, the fingerprint identification device is on a non-light emitting side of the display panel; and the display panel is at a side of the receiving electrode layer away from the piezoelectric material layer.

For example, in at least one example of the display device, an area of the fingerprint identification device is greater than or equal to an area of a display area of the display panel.

For example, in at least one example of the display device, the display panel is an organic light-emitting diode display panel or a quantum dot display panel.

At least one embodiment of the present disclosure further provides a driving method for driving the fingerprint identification device provided by any embodiment of the present disclosure, which comprises: applying the drive voltage and the first fixed voltage to the drive electrode layer simultaneously; applying the second fixed voltage to the receiving electrode layer while acquiring the electrical signals output by the receiving electrode layer; and obtaining the fingerprint image according to the electrical signals.

For example, in at least one example of the driving method, the drive electrode layer comprises the plurality of drive electrodes spaced apart from each other, and the receiving electrode layer comprises the plurality of receiving electrodes spaced apart from each other; the applying the drive voltage and the first fixed voltage to the drive electrode layer simultaneously, and applying the second fixed voltage to the receiving electrode layer while acquiring the electrical signals output by the receiving electrode layer, comprises: applying the first fixed voltage to the second part of the plurality of drive electrodes of the drive electrode layer while applying the drive voltage to the first part of the plurality of drive electrodes of the drive electrode layer, acquiring the electrical signals from the receiving electrode that is opposite to the second part of the plurality of drive electrodes while applying the second fixed voltage to the receiving electrode that is opposite to the first part of the plurality of drive electrodes; and a difference between the drive voltage and the second fixed voltage changing with time.

For example, in at least one example of the driving method, the plurality of drive electrodes in the drive electrode layer comprises first drive electrodes and second drive electrodes; the plurality of receiving electrodes in the receiving electrode layer comprises first receiving electrodes and second receiving electrodes; the first drive electrodes and the first receiving electrodes overlap in a direction perpendicular to the fingerprint identification device; the second drive electrodes and the second receiving electrodes overlap in a direction perpendicular to the fingerprint identification device; and the applying the first fixed voltage to the second part of the plurality of drive electrodes of the drive electrode layer while applying the drive voltage to the first part of the plurality of drive electrodes of the drive electrode layer, acquiring the electrical signals from the receiving electrode that is opposite to the second part of the plurality of drive electrodes while applying the second fixed voltage to the receiving electrode that is opposite to the first part of the plurality of drive electrodes, comprises: in a first time period, applying the drive voltage to the first drive electrodes, applying the second fixed voltage to the first receiving electrodes to drive the piezoelectric material layer to emit the ultrasonic waves, and applying the first fixed voltage to the second drive electrodes to receive the electrical signals output by the second receiving electrodes; in a second time period, applying the drive voltage to the second drive electrodes, applying the second fixed voltage to the second receiving electrodes to drive the piezoelectric material layer to emit the ultrasonic waves, and applying the first fixed voltage to the first drive electrodes to receive the electrical signals output by the first receiving electrodes; and the second time period being delayed from the first time period.

At least one embodiment of the present disclosure further provides a driving method for driving the another fingerprint identification device provided by any embodiment of the present disclosure, which comprises: driving the first part of the plurality of fingerprint identification units to emit the ultrasonic waves in the first time period; driving the second part of the plurality of fingerprint identification units to convert the ultrasonic waves, which are emitted by the first part of the plurality of fingerprint identification units and reflected by the fingerprint to be detected, into the electrical signals in the first time period to acquire the electrical signals; driving the second part of the plurality of fingerprint identification units to emit the ultrasonic waves in the second time period; and driving the first part of the plurality of fingerprint identification units to convert the ultrasonic waves, which are emitted by the second part of the plurality of fingerprint identification units and reflected by the fingerprint to be detected, into the electrical signals in the second time period to acquire the electrical signals.

For example, in at least one example of the driving method, the driving the first part of the plurality of fingerprint identification units to emit the ultrasonic waves in the first time period, comprises: in the first time period, applying a drive voltage to first electrodes in the first part of the plurality of fingerprint identification units, and applying a second fixed voltage to second electrodes in the first part of the plurality of fingerprint identification units, and making a difference between the drive voltage and the second fixed voltage change along with time; the driving the second part of the plurality of fingerprint identification units to convert the ultrasonic waves, which are emitted by the first part of the plurality of fingerprint identification units and reflected by the fingerprint to be detected, into the electrical signals in the first time period to acquire the electrical signals, comprises: in the first time period, applying a first fixed voltage to first electrodes in the second part of the plurality of fingerprint identification units and acquiring the electrical signals from second electrodes in the second part of the plurality of fingerprint identification units; the driving the second part of the fingerprint identification units to emit the ultrasonic waves in the second time period, comprises: in the second time period, applying the drive voltage to the first electrodes in the second part of the fingerprint identification units, and applying the second fixed voltage to the second electrodes in the second part of the fingerprint identification units, and making the difference between the drive voltage and the second fixed voltage change along with time; the driving the first part of the plurality of fingerprint identification units to convert the ultrasonic waves, which are emitted by the second part of the plurality of fingerprint identification units and reflected by the fingerprint to be detected, into the electrical signals in the second time period to acquire the electrical signals, comprises: in the second time period, applying the first fixed voltage to the first electrodes in the first part of the plurality of fingerprint identification units and acquiring the electrical signals from the second electrodes in the first part of the plurality of fingerprint identification units.

BRIEF DESCRIPTION OF THE DRAWINGS

In order to clearly illustrate the technical solution of the embodiments of the disclosure, the drawings used in the description of the embodiments or relevant technologies will be briefly described in the following; it is obvious that the described drawings are only related to some embodiments of the disclosure and thus are not limitative of the disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "comprise," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

In the research, the inventors of the present disclosure have noticed that in the process of fingerprint identification, the phenomenon of electric leakage occurs in the ultrasonic sensor in related art, which leads to the obtained fingerprint image inaccurate, and affects the accuracy of the fingerprint identification.

Figure 1A:
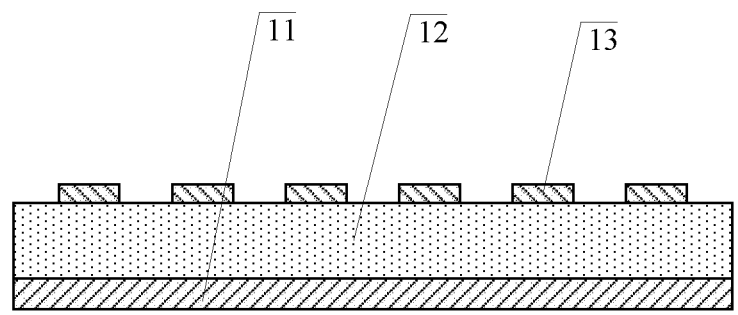
FIG. 1A is a schematically structural diagram of a fingerprint identification device in related art.

FIG. 1A is a schematically structural diagram of a fingerprint identification device in related art; as illustrated in FIG. 1A, the fingerprint identification device in the related art includes a drive electrode 11, a piezoelectric material layer 12, and a receiving electrode 13, the drive electrode 11 is a planar electrode, and the receiving electrode 13 includes a plurality of receiving sub-electrodes arranged in an array. For example, an orthographic projection of the planar electrode on the piezoelectric material layer 12 completely covers an orthographic projection of the receiving electrode 13 on the piezoelectric material layer 12.

For example, the fingerprint identification device as illustrated in FIG. 1A is a fingerprint identification device based on ultrasonic waves. For example, the drive electrode 11 completely covers the piezoelectric material layer 12 in a direction perpendicular to the fingerprint identification device. For example, the plurality of receiving sub-electrodes are spaced apart and electrically insulated from each other. For example, the plurality of receiving sub-electrodes are in direct contact with the piezoelectric material layer 12; the drive electrode 11 is in direct contact with the piezoelectric material layer 12.

For example, the working principle of fingerprint identification in related technologies is as follows: a drive voltage is applied to the drive electrode 11 and a fixed voltage is applied to the receiving electrode 13, the piezoelectric material layer 12 generates an ultrasonic wave under an excitation of the drive voltage, and the piezoelectric material layer 12 converts an ultrasonic wave, which are reflected from a fingerprint, to an electrical signal; During the process of converting the ultrasonic wave to the electrical signal, applying of the drive voltage to the drive electrode 11 is stopped, and in the case where the ultrasonic waves are received, the fixed voltage is applied to the drive electrode 11, to obtain electrical signals output by a plurality of rows (for example, 1-10 rows) of receiving sub-electrodes; by analogy, then, the drive voltage is applied to the drive electrode 11, and obtaining electrical signals output by other rows (for example, 11-20 rows) of receiving sub-electrodes, until electrical signals output by all receiving sub-electrodes are obtained.

For example, the laminated structure of the receiving electrode 13, the piezoelectric material layer 12, and the drive electrode 11, which are stacked, can be used to emit ultrasonic waves, and can also be used to convert ultrasonic waves, which are reflected by a fingerprint and incident on the laminated structure of the receiving electrode 13, the piezoelectric material layer 12, and the drive electrode 11, which are stacked, into electrical signals. For example, the piezoelectric material layer 12 converts the drive voltage applied onto the drive electrode 11 into mechanical motion based on piezoelectric effect, to generate the ultrasonic waves; and based on the piezoelectric effect, the piezoelectric material layer 12 converts the mechanical motion caused by the ultrasonic waves, which are reflected by the fingerprint to be detected and incident on the laminated structure into electrical signals. For example, the laminated structure of the receiving electrode 13, the piezoelectric material layer 12, and the drive electrode 11, which are stacked, realizes the functions of emitting the ultrasonic waves and converting the ultrasonic waves into the electrical signals by a time division manner. The following is an exemplary description with reference to FIG. 1B.

Figure 1B:
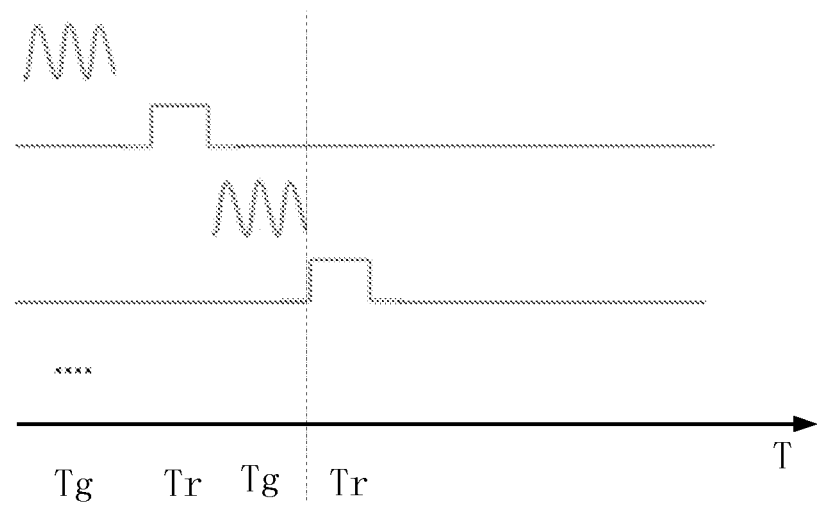
FIG. 1B is a driving timing chart of the fingerprint identification device illustrated in FIG. 1A.

FIG. 1B is a driving timing chart of the fingerprint identification device as illustrated in FIG. 1A. For example, as illustrated in FIG. 1B, on a time axis T, each operation cycle of the fingerprint identification device includes an ultrasonic wave generation stage Tg and an ultrasonic wave reception stage Tr which are arranged alternately.

For example, as illustrated in FIG. 1B, in the ultrasonic wave generation stage, the drive voltage (e.g., an AC voltage, i.e., a voltage that changes a polarity or a sign of a voltage difference between the drive electrode 11 and the receiving sub-electrode) is applied to the drive electrode, and the fixed voltage (e.g., a ground voltage, e.g., 0 volts) is applied to the plurality of receiving sub-electrodes, the piezoelectric material layer 12 is deformed and vibrated (for example, vibrates in a direction in which the receiving sub-electrode and the drive electrode 11 are opposite to each other) and generates a sound wave (for example, ultrasonic wave) under the excitation of the drive voltage and the fixed voltage.

For example, as illustrated in FIG. 1B, in the ultrasonic wave reception stage, the generated sound wave is reflected by a fingerprint to be detected and then is incident on the laminated structure of the receiving electrode 13, the piezoelectric material layer 12 and the drive electrode 11, which are stacked, to cause the piezoelectric material layer 12 to vibrate (for example, vibrating in the direction in which the receiving sub-electrode and the drive electrode 11 are opposite to each other), and the piezoelectric material layer 12 converts the vibration caused by the sound wave (for example, the ultrasonic wave) reflected by the fingerprint to be detected into electrical signals (for example, AC voltages). For example, as illustrated in FIG. 1B, in the ultrasonic wave reception stage, the fixed voltage (e.g., the ground voltage, e.g., 0 volts), instead of the drive voltage, is applied to the drive electrode 11, so as to obtain the electrical signals output by the receiving sub-electrodes located in part of rows or part of columns in the receiving electrode 13.

For example, as illustrated in FIG. 1B, each operation cycle of the fingerprint identification device includes a plurality of ultrasonic wave reception stages; in each of the plurality of ultrasonic wave reception stages, the receiving sub-electrodes located in part of rows (or part of columns) output electrical signals; and correspondingly, each operation cycle of the acoustic fingerprint identification sensor includes a plurality of ultrasonic wave generation stages.

For example, in each of the plurality of ultrasonic wave generation stages, the drive voltage (e.g., the AC voltage) is applied to the drive electrode 11, and the fixed voltage (e.g., the ground voltage) is applied to the receiving sub-electrodes, so that the piezoelectric material layer 12 deforms and vibrates under the excitation of the drive voltage and the fixed voltage, and generates ultrasonic waves. For example, in a first (from left to right) ultrasonic wave reception stage Tr, as illustrated in FIG. 1B, the receiving sub-electrodes located in the 1st-10th rows output electrical signal; in a second (from left to right) ultrasonic wave reception stage Tr, as illustrated in FIG. 1B, the receiving sub-electrodes located in the 11th-20th rows output electrical signals; and so on, until all receiving sub-electrodes output electrical signals.

For example, the fingerprint identification device as illustrated in FIG. 1A, may further include a driving circuit (not shown in the figures) that is electrically connected to the drive electrode 11, to apply the drive voltage (e.g., the AC voltage) to the drive electrode 11 in the ultrasonic wave generation stage. For example, in the ultrasonic wave generation stage, a receiving sub-electrode receives a fixed voltage.

For example, the fingerprint identification device as illustrated in FIG. 1A may further include a plurality of detection circuits or a plurality of signal readout circuits (not shown in the figures), which are electrically connected to the plurality of receiving sub-electrodes, respectively, so as to obtain the electrical signals from the plurality of receiving sub-electrodes, respectively, in the ultrasonic wave generation stage. For example, in the ultrasonic wave generation stage, the drive electrode 11 receives a fixed voltage.

The inventors of the present disclosure have noticed that there is a leakage phenomenon when obtaining the electrical signal output by the receiving sub-electrode. For example, the charge stored at an input end (that is, the end connected to the receiving sub-electrode) of the detection circuit or the signal readout circuit can be leaked, and an amount (or a number) of leaked charges is different at different times; therefore, the readout signal can be distorted, which leads to the obtained fingerprint image inaccurate, thereby affecting the accuracy of the fingerprint identification.

At least one embodiment of the present disclosure provides a fingerprint identification device, a driving method thereof, and a display device.

For example, the fingerprint identification device includes a receiving electrode layer, a piezoelectric material layer, and a drive electrode layer. The piezoelectric material layer is between the receiving electrode layer and the drive electrode layer; the drive electrode layer includes a plurality of drive electrodes spaced apart from each other; the receiving electrode layer includes a plurality of receiving electrodes spaced apart from each other; a first part of the plurality of drive electrodes included in the drive electrode layer is configured to receive a drive voltage in operation; a second part of the plurality of drive electrodes included in the drive electrode layer is configured to receive a first fixed voltage in operation; receiving electrodes that are opposite to the first part of the plurality of drive electrodes are configured to receive a second fixed voltage in operation; a difference between the drive voltage and the second fixed voltage is configured to change along with time; areas of the piezoelectric material layer opposite to the first part of the plurality of drive electrodes are configured to emit the ultrasonic waves at least under the excitation of the drive voltage in operation; and regions of the piezoelectric material layer that are opposite to the second part of the plurality of drive electrodes are configured to convert ultrasonic waves, which are emitted by the regions of the piezoelectric material layer that are opposite to the first part of the plurality of drive electrodes and reflected by the fingerprint to be detected, into electrical signals in operation, and the electrical signals are used for obtaining a fingerprint image.

For example, the fingerprint identification device is a fingerprint identification device based on ultrasonic waves, the fingerprint identification device can emit ultrasonic waves and convert received ultrasonic waves into electrical signals simultaneously. For example, at the same time point, some regions of the fingerprint identification device emit ultrasonic waves, while other regions of the fingerprint identification device convert received ultrasonic waves into electrical signals.

Non-limitative descriptions are given to the fingerprint identification device provided by the embodiments of the present disclosure in the following with reference to several examples or embodiments. As described in the following, in case of no conflict, different features in these specific examples or embodiments can be combined with each other, so as to obtain new examples or embodiments, and the new examples or embodiments are also fall within the scope of the present disclosure.

Figure 2:
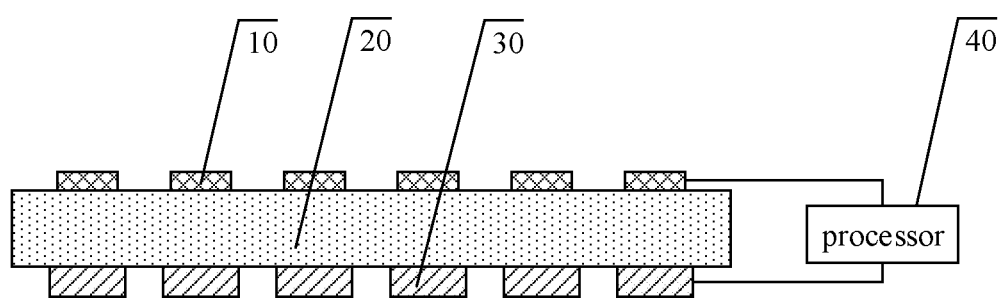
FIG. 2 is a first schematically structural diagram of a fingerprint identification device provided by some embodiments of the present disclosure.

Some embodiments of the present disclosure provide a fingerprint identification device, FIG. 2 is a first schematically structural diagram of the fingerprint identification device provided by some embodiments of the present disclosure. As illustrated in FIG. 2, the fingerprint identification device provided by some embodiments of the present disclosure includes a receiving electrode layer 10, a piezoelectric material layer 20, a drive electrode layer 30, and a processor 40. The piezoelectric material layer 20 is between the receiving electrode layer 10 and the drive electrode layer 30.

For example, the piezoelectric material layer 20 is used to emit ultrasonic waves under the excitation of the drive voltage, and is also used to convert ultrasonic waves, which are reflected from the fingerprint to be detected, into electrical signals; the processor 40 is configured to be connected to the drive electrode layer 30 and the receiving electrode layer 10 respectively, and is used for simultaneously applying the drive voltage and the fixed voltage to the drive electrode layer 30, applying a fixed voltage to the receiving electrode layer 10 while obtaining the electrical signals output by the receiving electrode layer 10, and obtaining a fingerprint image according to the electrical signals.

For example, materials of the receiving electrode layer 10 and the drive electrode layer 30 are not limited as long as they are conductive. For example, materials of the receiving electrode layer 10 and the drive electrode layer 30 may adopt metallic materials, such as platinum, iridium, gold, aluminum, copper, titanium and stainless steel, etc., and tin oxide-based conductive materials, such as indium tin oxide and fluorine-doped tin oxide, etc., and each of the receiving electrode layer 10 and the drive electrode layer 30 may also be a multi-layer conductive structure including a first metal layer, a second metal layer and a third metal layer, the first metal layer may be made of titanium, the second metal layer may be made of aluminum, the third metal layer may be made of titanium, the first metal layer is closer to the substrate as compared with the second metal layer, and the third metal layer is arranged between the first metal layer and the second metal layer, and no specific limitation will be given to the materials and structures of the receiving electrode layer and the drive electrode layer in some embodiments of the present disclosure. It should be noted that the materials of the drive electrode layer 30 and the receiving electrode layer 10 may be the same or different, and no specific limitation will be given to some embodiments of the present disclosure in this respect.

For example, in order to enable the emission efficiency of the ultrasonic wave higher, the drive electrode layer 30 is applied with a higher drive voltage. In this case, the drive electrode layer 30 is thicker. For example, the drive electrode layer 30 is made of silver with high conductivity, and the thickness of the drive electrode layer 30 is greater than 10 microns.

For example, the piezoelectric material layer 20 may be made of piezoelectric materials, such as polyvinylidene fluoride (PVDF), aluminum nitride (AlN), zinc oxide (ZnO) or lead zirconate titanate piezoelectric ceramics (PZT), some embodiments of the present disclosure are not limited to this case.

For example, in order to realize high receiving sensitivity to the ultrasonic waves, PVDF is usually adopted as the piezoelectric material layer 20.

For example, the processor 40 may include a central processing unit, a field programmable logic array, a digital signal processor, a single chip microcomputer or a dedicated logic circuit, and other devices with data processing capability and/or program execution capability. For example, the processor 40 is in communication connection with the drive electrode layer 30 and the receiving electrode layer 10. For example, the communication connection includes connection through wireless network, wired network, and/or any combination of wireless network and wired network. The network can include local area network, Internet, telecommunication network, Internet of Things based on Internet and/or telecommunication network, and/or any combination of the above networks. The wired networks can use wires, twisted pairs, coaxial cables or optical fiber transmission, etc. for information transmission, and the wireless networks can use WWAN mobile communication network, Bluetooth, Zigbee or WiFi for communication.

Figure 3A:
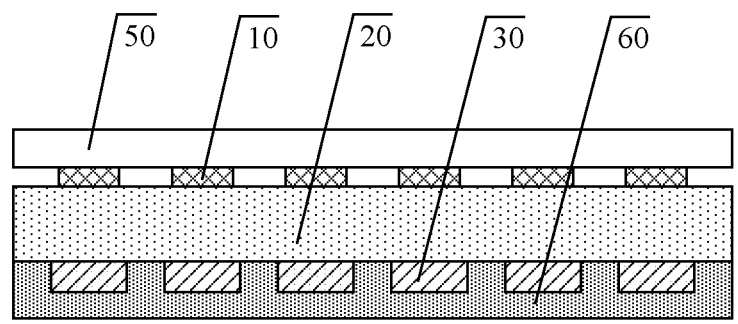
FIG. 3A is a second schematically structural diagram of a fingerprint identification device provided by some embodiments of the present disclosure.
Figure 3B:
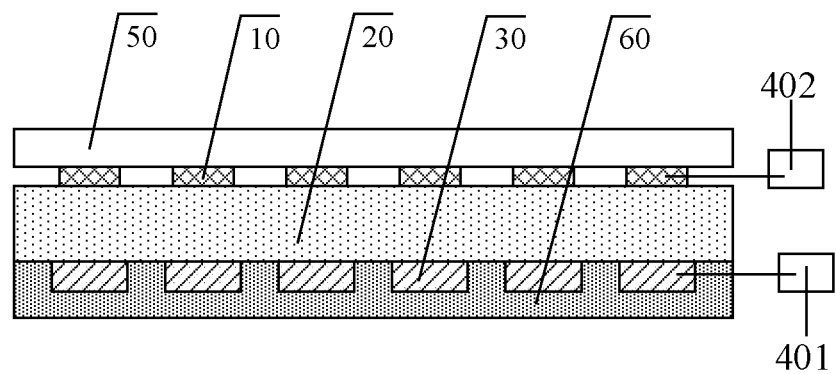
FIG. 3B is a third schematically structural diagram of a fingerprint identification device provided by some embodiments of the present disclosure.
Figure 3C:
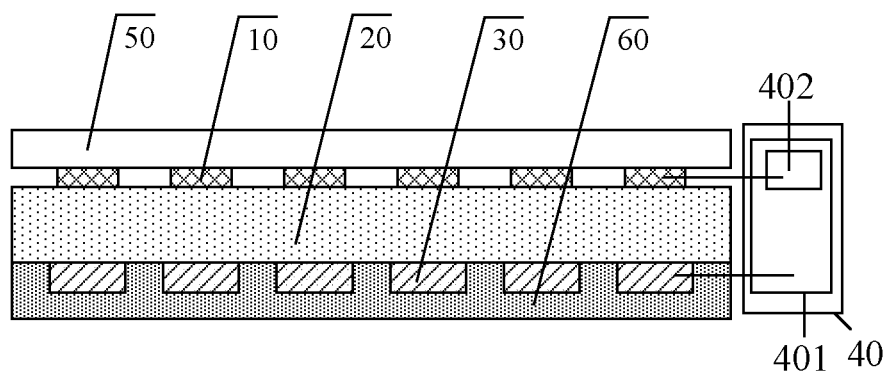
FIG. 3C is a fourth schematically structural diagram of a fingerprint identification device provided by some embodiments of the present disclosure.

In some examples, as illustrated in FIG. 3C, the processor 40 may include a driving circuit 401, which may include a signal readout circuit 402, but embodiments of the present disclosure are not limited thereto. For example, as illustrated in FIG. 3B, the driving circuit 401 and the signal readout circuit 402 included in the fingerprint identification device are circuits which are separately set and can be independently controlled, and are separately set from a processor (not illustrated in FIG. 3B).

The fingerprint identification device provided by some embodiments of the present disclosure includes: a receiving electrode layer, a piezoelectric material layer, a drive electrode layer and a processor; the piezoelectric material layer is arranged between the receiving electrode layer and the drive electrode layer; the piezoelectric material layer is used for emitting ultrasonic waves under the excitation of a drive voltage, and further used for converting ultrasonic waves, which are reflected by the fingerprint to be detected, into the electrical signals; and the processor is connected to the drive electrode layer and the receiving electrode layer, respectively, and used for applying a fixed voltage while applying the drive voltage to the drive electrode layer, applying a fixed voltage to the receiving electrode layer while obtaining the electrical signals output by the receiving electrode layer, and obtaining a fingerprint image according to the electrical signals. For example, according to the technical scheme provided by some embodiments of the present disclosure, the processor loads a fixed voltage to a drive electrode layer while loading the drive voltage to the drive electrode layer, and the processor loads a fixed voltage to the receiving electrode layer while obtaining electrical signals output by the receiving electrode layer, thereby realizing real-time emission and real-time reception of the ultrasonic waves, suppressing the electrical leakage, ensuring the accuracy of the obtained fingerprint image, improving the stability of fingerprint identification device performance, and improving fingerprint identification accuracy.

For example, FIG. 3A is a second schematically structural diagram of the fingerprint identification device provided by some embodiments of the present disclosure, as illustrated in FIG. 3A, the fingerprint identification device provided by some embodiments of the present disclosure further includes a substrate 50 and a protective layer 60.

For example, the substrate 50 is located on a side of the receiving electrode layer 10 away from the piezoelectric material layer 20, and the protective layer 60 is located on a side of the drive electrode layer 30 away from the piezoelectric material layer 20.

For example, the substrate 50 can be served as a surface for contacting a display panel, and can also be served as a surface for contacting a fingerprint, some embodiments of the present disclosure are not limited to this case. For example, the substrate 50 may be in contact with the display panel via optical glue.

For example, the substrate 50 may be a rigid substrate or a flexible substrate, the rigid substrate may be, but not limited to, one or more of glass and metal foil; and the flexible substrate can be one or more of polyethylene terephthalate, polyethylene terephthalate, polyether ether ketone, polystyrene, polycarbonate, polyarylate, polyarylate, polyimide, polyvinyl chloride, polyethylene, and textile fiber.

For example, a flexible plastic substrate, such as polyimide or the like, is adopted as the substrate 50, which is beneficial to realize a flexible display screen. In the case where the substrate 50 adopts polyimide, a polyimide layer can be formed on a glass substrate, then the receiving electrode layer, the piezoelectric material layer and the drive electrode layer are formed on the polyimide layer, and finally the glass substrate is removed.

Figure 3D:
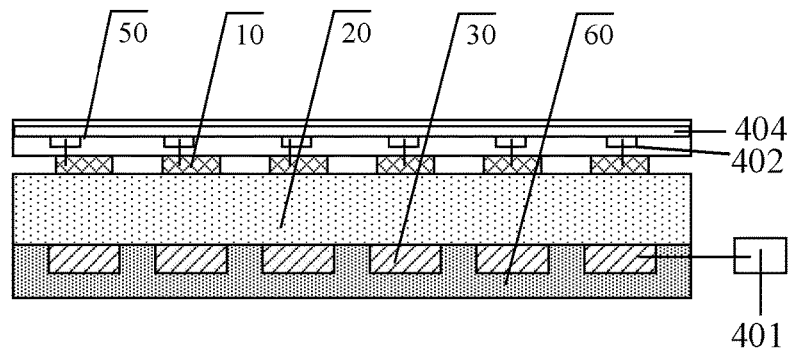
FIG. 3D is a fifth schematically structural diagram of a fingerprint identification device provided by some embodiments of the present disclosure.
Figure 7:
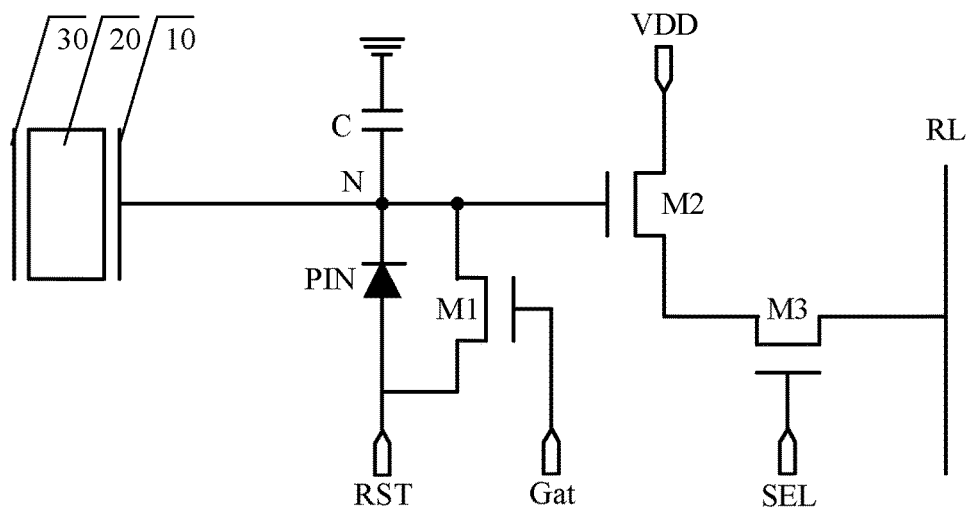
FIG. 7 is an equivalent circuit diagram of a driving circuit provided by some embodiments of the present disclosure.

For example, the fingerprint identification device includes a plurality of signal readout circuits. For example, as illustrated in FIG. 7, each signal readout circuit includes a thin film transistor, and at least one thin film transistor of each signal readout circuit is electrically connected to a corresponding receiving electrode. For example, the substrate 50 is a thin film transistor substrate. For example, as illustrated in FIG. 3D, the substrate 50 includes a plurality of signal readout circuits 402 and a base layer 404, and the base layer 404 is located on a side of the plurality of signal readout circuits 402 away from the plurality of receiving electrodes 10.

For example, the protective layer 60 is used to protect the drive electrode layer 30. For example, the protective layer 60 can be made of epoxy resin, some embodiments of the present disclosure are not limited to this case.

For example, the receiving electrode layer includes a plurality of receiving electrodes spaced apart from each other and electrically insulated from each other.

Figure 4A:
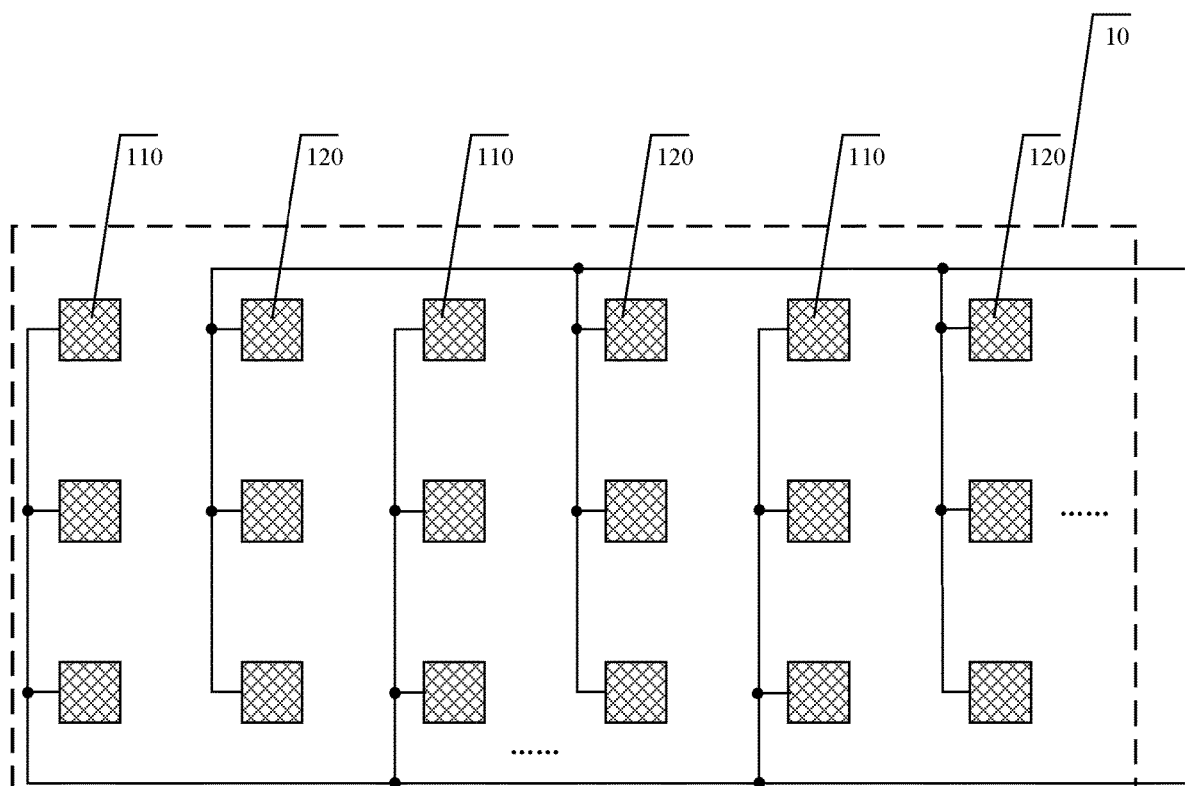
FIG. 4A is a top view of a receiving electrode layer provided by some embodiments of the present disclosure.

For example, FIG. 4A is a top view of a receiving electrode layer provided by some embodiments of the present disclosure. As illustrated in FIG. 4A, the receiving electrode layer 10 in the fingerprint identification device provided by some embodiments of the present disclosure includes M rows and N columns of receiving electrodes; the receiving electrodes include first receiving electrodes 110 and second receiving electrodes 120; the receiving electrodes in odd columns are the first receiving electrodes 110, and the receiving electrodes in even columns are the second receiving electrodes 120, all the first receiving electrodes 110 are connected to each other, and all the second receiving electrodes 120 are connected to each other.

Figure 4B:
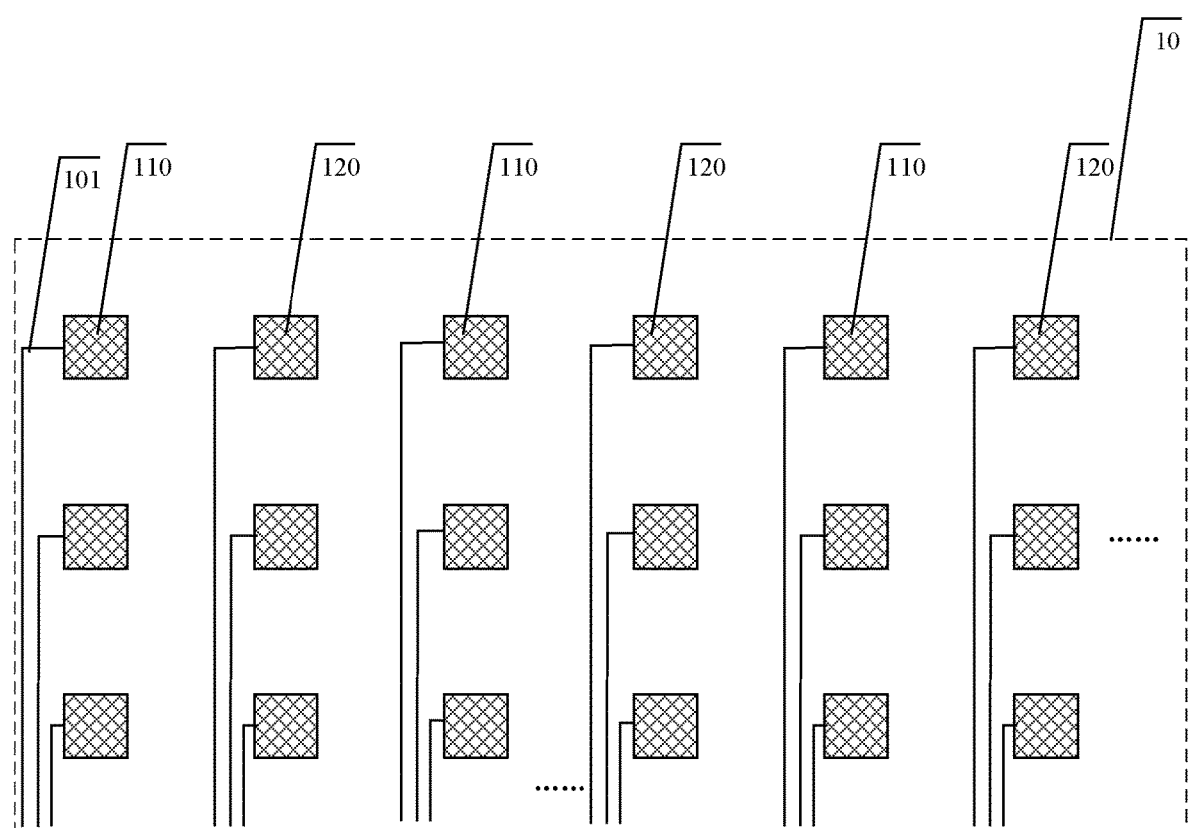
FIG. 4B is a top view of another receiving electrode layer provided by some embodiments of the present disclosure.

For example, FIG. 4B is a top view of another receiving electrode layer provided by some embodiments of the present disclosure, as illustrated in FIG. 4B, the receiving electrode layer 10 in the fingerprint identification device provided by some embodiments of the present disclosure includes M rows and N columns of receiving electrodes. For example, M and N are both positive integers greater than 1. For example, M rows and N columns of receiving electrodes include first receiving electrodes 110 and second receiving electrodes 120. For example, the plurality of receiving electrodes includes a first amount of first receiving electrodes 110 and a second amount of second receiving electrodes 120. For example, the first amount is equal to the second amount (both of them are positive integer greater than 1), and the first receiving electrodes 110 and the second receiving electrodes 120 are alternately arranged in a row direction. For example, the receiving electrodes in odd columns are the first receiving electrodes 110, and the receiving electrodes in even columns are the second receiving electrodes 120. For example, as illustrated in FIG. 4B, each of the first amount of first receiving electrodes 110 and the second amount of second receiving electrodes 120 is electrically connected to a readout line 101 of a corresponding one of the signal readout circuits, respectively.

It should be noted that, although in FIG. 4A and FIG. 4B, the receiving electrode layer 10 is illustrated by taking the first receiving electrodes 110 and the second receiving electrodes 120 alternately arranged in the row direction as an example, some embodiments of the present disclosure are not limited to this case, and the receiving electrode layer 10 can also adopt other arrangements of receiving electrode. For example, two or zero second receiving electrodes 120 are between two first receiving electrodes 110 adjacent to each other in the row direction, and two or zero first receiving electrodes 110 are between two second receiving electrodes 120 adjacent to each other in the row direction.

For example, a processor (e.g., the signal readout circuit of the driving circuit included in the processor) loads a fixed voltage (e.g., the second fixed voltage) to all second receiving electrodes while obtaining (e.g., acquiring) the electrical signals output by all first receiving electrodes, or loads a fixed voltage (e.g., the second fixed voltage) to all first receiving electrodes while obtaining the electrical signals output by all second receiving electrodes.

For example, the specific amount and size of the receiving electrodes can be determined according to fingerprint identification accuracy, and no specific limitation will be given to some embodiments of the present disclosure in this respect.

For example, in order to improve fingerprint identification accuracy, the area of a receiving electrode is equal to the area of a pixel unit in the display panel, and an amount of the receiving electrodes is equal to an amount of pixel units. For example, in order to reduce the manufacturing difficulty and cost, the area of a receiving electrode is larger than that of a pixel unit in the display panel, and the amount of the receiving electrodes is smaller than that of the pixel units. For example, the ratio of the amount of the receiving electrodes and the amount of the pixel units can be 1:N (N is an integer greater than or equal to 2), that is, one receiving electrode corresponds to N pixel units.

Figure 5A:
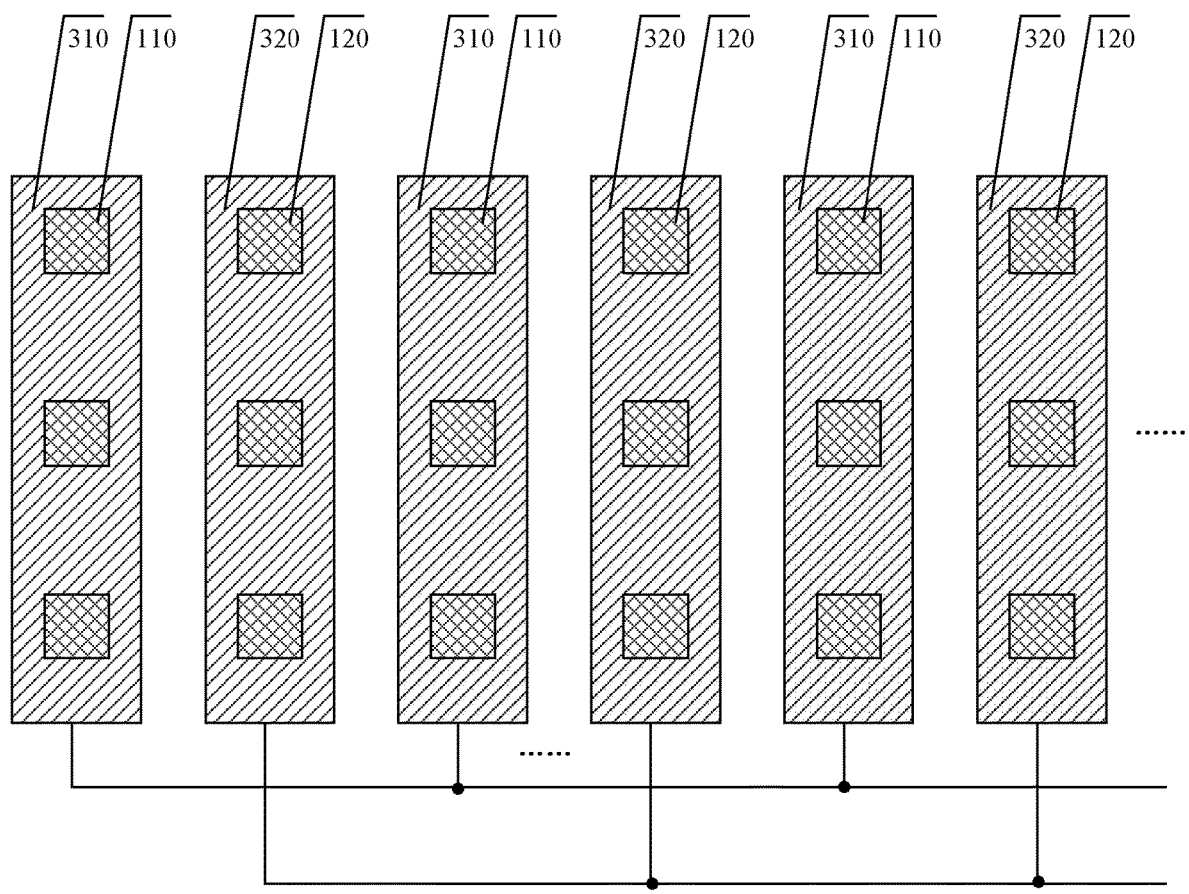
FIG. 5A is a first top view of a receiving electrode layer and a drive electrode layer provided by some embodiments of the present disclosure.

For example, as an embodiment, FIG. 5A is a first top view of the receiving electrode layer and the drive electrode layer provided by some embodiments of the present disclosure, as illustrated in FIG. 5A, the drive electrode layer 30 includes a plurality of drive electrodes arranged in one row and N columns. For example, the plurality of drive electrodes are spaced apart from each other. For example, the plurality of drive electrodes include a third amount of first drive electrodes 310 and a fourth amount of second drive electrodes 320. For example, the third amount is equal to the fourth amount (both of them are positive integer greater than 1), and the third amount of first drive electrodes 310 and the fourth amount of second drive electrodes 320 are alternately arranged in the row direction. For example, the first drive electrodes 310 and the second drive electrodes 320 are electrically insulated from each other.

For example, the drive electrode (for example, each of the plurality of drive electrodes) is a strip-shaped electrode, and for example, a length-width ratio of the strip-shaped electrode is greater than 3. For example, as illustrated in FIG. 5A, the drive electrodes in odd columns are the first drive electrodes 310, and the receiving electrodes in even columns are the second drive electrodes 320. For example, in the example as illustrated in FIG. 5A, the amount of the receiving electrodes is equal to M times the amount of drive electrodes.

For example, as illustrated in FIG. 5A, all the first drive electrodes 310 are connected to each other, and all the second drive electrodes 320 are connected to each other. For another example, all the first drive electrodes 310 are electrically insulated from each other, and all the second drive electrodes 320 are electrically insulated from each other; in this case, each of the first drive electrodes 310 and the second drive electrodes 320 is electrically connected to the driving circuit via a corresponding wire.

For example, as illustrated in FIG. 5A, the orthographic projection of the drive electrode in each column on the piezoelectric material layer completely covers the orthographic projections of receiving electrodes in a corresponding column on the piezoelectric material layer. For example, as illustrated in FIG. 5A, the orthographic projection of the drive electrode in the i-th column on the piezoelectric material layer covers the orthographic projections of receiving electrodes in the i-th column on the piezoelectric material layer, and $1 \leq i \leq N$. That is, the area of the drive electrode in the i-th column is larger than the sum of areas of all receiving electrodes in the i-th column.

For example, as illustrated in FIG. 5A, the orthographic projection of each first drive electrode 310 on the piezoelectric material layer completely covers the orthographic projections of first receiving electrodes 110 in a corresponding column on the piezoelectric material layer; and the orthographic projection of each second drive electrode 320 on the piezoelectric material layer completely covers the orthographic projections of second receiving electrodes 130 in a corresponding column on the piezoelectric material layer.

For another example, as illustrated in FIG. 5A, the orthographic projection of each first drive electrode 310 on the piezoelectric material layer completely covers the orthographic projections of first receiving electrodes 110 in a plurality of columns (for example, two columns, three columns or other suitable numbers) arranged in the row direction on the piezoelectric material layer; the orthographic projection of each second drive electrode 320 on the piezoelectric material layer completely covers the orthographic projections of second receiving electrodes 130 in a plurality of columns (e.g., two columns, three columns or other suitable number) arranged in the row direction on the piezoelectric material layer.

Figure 5B:
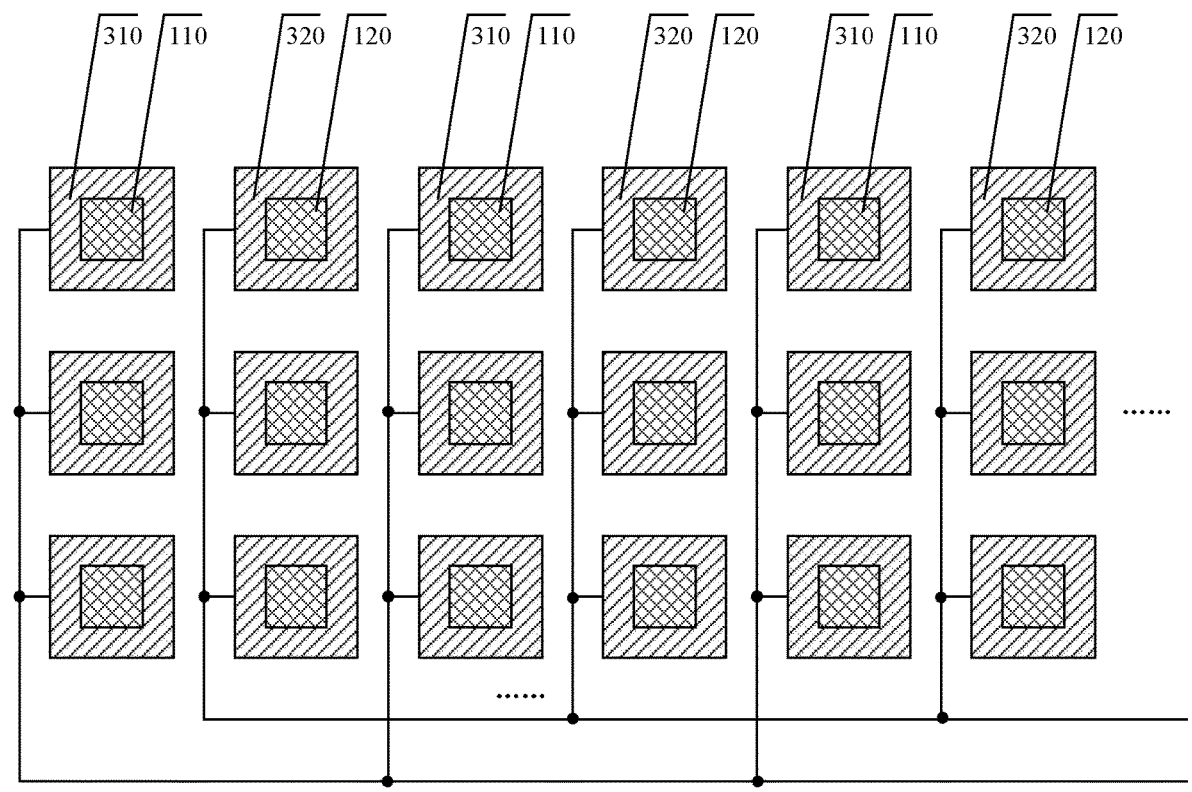
FIG. 5B is a second top view of a receiving electrode layer and a drive electrode layer provided by some embodiments of the present disclosure.

For example, as another embodiment, FIG. 5B is a second top view of the receiving electrode layer and the drive electrode layer provided by some embodiments of the present disclosure, as illustrated in FIG. 5B, the drive electrode layer 30 includes M rows and N columns of drive electrodes, that is, the drive electrode layer 30 includes a plurality of drive electrodes arranged in M rows and N columns. For example, the plurality of drive electrodes include first drive electrodes 310 and second drive electrodes 320. For example, the plurality of drive electrodes include a fifth amount of first drive electrodes 310 and a sixth amount of second drive electrodes 320. For example, the fifth amount is equal to the sixth amount (positive integer greater than 1), and the first drive electrodes 310 and the second drive electrodes 320 are alternately arranged in the row direction. For example, the drive electrodes in odd columns are the first drive electrodes 310, and the drive electrodes in even columns are the second drive electrodes 320. For example, as illustrated in FIG. 5B, all the first drive electrodes 310 are connected to each other, and all the second drive electrodes 320 are connected to each other. For example, in the example as illustrated in FIG. 5B, the amount of the drive electrodes is equal to the amount of the receiving electrodes.

For example, as illustrated in FIG. 5B, the orthographic projection of each drive electrode on the piezoelectric material layer completely covers the orthographic projection of a corresponding receiving electrode on the piezoelectric material layer. For example, as illustrated in FIG. 6, the orthographic projection of the drive electrode in the i-th row and j-th column on the piezoelectric material layer covers the orthographic projection of the receiving electrode in i-th row and j-th column on the piezoelectric material layer, $1 \leq i \leq M$ and $1 \leq j \leq N$.

For example, as illustrated in FIG. 5B, the orthographic projection of each first drive electrode 310 on the piezoelectric material layer completely covers the orthographic projection of a corresponding first receiving electrode 110 on the piezoelectric material layer; and the orthographic projection of each second drive electrode 320 on the piezoelectric material layer completely covers the orthographic projection of a corresponding second receiving electrode 130 on the piezoelectric material layer.

For another example, the orthographic projection of each first drive electrode 310 on the piezoelectric material layer completely covers the orthographic projections of a plurality (for example, two, three or other applicable numbers) of first receiving electrodes 110 arranged in the row direction on the piezoelectric material layer; and the orthographic projection of each second drive electrode 320 on the piezoelectric material layer completely covers the orthographic projections of a plurality (for example, two, three or other suitable number) of second receiving electrodes 130 arranged in the row direction on the piezoelectric material layer.

It should be noted that, although in FIG. 5A and FIG. 5B, the case where the first drive electrode 310 and the second drive electrode 320 are alternately arranged in the row direction is taken as an example, some embodiments of the present disclosure are not limited to this case, and the drive electrode layer can also adopt other arrangements of receiving electrode. For example, two or zero second drive electrodes 320 are between two first drive electrodes 310 adjacent to each other in the row direction, and two or zero first drive electrodes 310 are between two second drive electrodes 320 adjacent to each other in the row direction.

For example, the processor (e.g., the driving circuit included in the processor) applies a fixed voltage (e.g., the first fixed voltage) to all second drive electrodes while applying the drive voltage to all first drive electrodes, or the processor applies a fixed voltage (e.g., the first fixed voltage) to all first drive electrodes while applying the drive voltage to all second drive electrodes. For example, the first fixed voltage is equal to or not equal to the second fixed voltage. For example, the first fixed voltage and the second fixed voltage are both equal to zero volt or a ground voltage.

In some embodiments of the present disclosure, in the case where the processor (e.g., the driving circuit included in the processor) loads drive voltages to all first drive electrodes, the processor (e.g., the signal readout circuit of the driving circuit included in the processor) also loads the fixed voltage (e.g., the second fixed voltages) to all receiving drive electrodes. In the case where the processor (e.g., the driving circuit included in the processor) loads the drive voltage to all second drive electrodes, the processor (e.g., the signal readout circuit of the driving circuit included in the processor) also loads the fixed voltage (e.g., the second fixed voltage) to all second receiving electrodes.

For example, in operation, the difference between the drive voltage and the second fixed voltage changes along with time, in this case, the deformation degree of the piezoelectric material layer changes, and correspondingly, the piezoelectric material layer can move in the direction perpendicular to the fingerprint identification device, so that the piezoelectric material layer can generate the ultrasonic waves. For example, in operation, the polarity or sign of the difference between the drive voltage and the second fixed voltage changes, that is, the drive voltage is an AC voltage.

It should be noted that all the first drive electrodes and all the second drive electrodes can be connected by punching or the like, and some embodiments of the present disclosure are not limited to this case, as long as all the first drive electrodes are connected and all the second drive electrodes are connected.

In some examples, the processor in the fingerprint identification device provided by some embodiments of the present disclosure further includes a driving circuit connected to the receiving electrode layer, FIG. 7 is an equivalent circuit diagram of the driving circuit (for example, a signal readout circuit included in the driving circuit) provided by the embodiments of the present disclosure. It should be noted that for convenience of description, FIG. 7 also shows the receiving electrode layer 10, the piezoelectric material layer 20, and the drive electrode layer 30.

For example, as illustrated in FIG. 7, the driving circuit (e.g., the signal readout circuit included in the driving circuit) provided by some embodiments of the present disclosure includes a storage capacitor C, a first transistor M1, a second transistor M2, a third transistor M3, and a diode PIN.

For example, the receiving electrode layer 10 (e.g., a corresponding receiving electrode included in the receiving electrode layer) is connected to a node N, a first end of the storage capacitor C is connected to the node N, a second end of the storage capacitor C is grounded, an anode of the diode PIN is connected to a reset signal terminal RST, a cathode of the diode PIN is connected to the node N, a control electrode of the first transistor M1 is connected to a scan signal terminal Gat, a first electrode of the first transistor M1 is connected to the node N, a second electrode of the first transistor M1 is connected to the reset signal terminal RST, a control electrode of the second transistor M2 is connected to the node N, a first electrode of the second transistor M2 is connected to a power signal terminal VDD, a second electrode of the second transistor M2 is connected to a first electrode of the third transistor M3, a control electrode of the third transistor M3 is connected to a readout control terminal SEL, and a second electrode of the third transistor M3 is connected to a readout signal line RL.

For example, the storage capacitor C is used to store the electrical signal received by the receiving electrode layer (for example, the corresponding receiving electrode included in the receiving electrode layer). The second transistor M2 and the third transistor M3 are used to readout the electrical signal stored in the storage capacitor C. In addition, in the process of storing in the storage capacitor C, the electrical signal received by the receiving electrode layer can be lifted by controlling the first transistor M1 and the photodiode PIN, so as to obtain a detection signal with a large contrast. It should be noted that the specific drive timing of the driving circuit in operation can be any suitable drive timing, as long as the above functions can be realized, some embodiments of the present disclosure are not limited to this case.

For example, in the case where the first transistor M1 is turned on, a reset signal (e.g., a reset voltage) provided by the reset signal terminal RST can reset the node N. For example, the reset voltage provided by the reset signal terminal RST may be equal to the second fixed voltage. In this case, the second fixed voltage may be applied to a corresponding receiving electrode (for example, a first receiving electrode) included in the receiving electrode layer by resetting the node N. For example, in the case where the second transistor M2 and the third transistor M3 are turned on, the electrical signals at the node N and a corresponding receiving electrode (e.g., a second receiving electrode) included in the receiving electrode layer can be acquired by the readout signal line RL.

For example, the fingerprint identification device includes a plurality of signal readout circuits, the amount of the plurality of signal readout circuits is equal to the amount of the receiving electrodes; the plurality of signal readout circuits (e.g., the node N of the signal readout circuits) are electrically connected to the plurality of receiving electrodes, respectively. For example, the plurality of signal readout circuits include a first signal readout circuit and a second signal readout circuit, and each of the first signal readout circuit and the second signal readout circuit may adopt the circuit structure as illustrated in FIG. 7. For example, the amount of the first signal readout circuits is equal to the amount of the first receiving electrodes, and the amount of the second signal readout circuits is equal to the amount of the second receiving electrodes; each first signal readout circuit is electrically connected to a corresponding first receiving electrode, and each second signal readout circuit is electrically connected to a corresponding second receiving electrode.

For example, in the first time period, the first transistor M1 of the first signal readout circuit, and the second transistor M2 and the third transistor M3 of the second signal readout circuit are turned on, the second transistor M2 and the third transistor M3 of the first signal readout circuit, and the first transistor M1 of the second signal readout circuit are turned off. Correspondingly, the first drive electrode that is opposite to the first receiving electrode receives the drive voltage; the second drive electrode that is opposite to the second receiving electrode receives the first fixed voltage; in this case, a second fixed voltage may be applied to the first receiving electrode electrically connected to the first signal readout circuit in the first time period, thereby the laminated structure of the first receiving electrode, the first drive electrode and a region of the piezoelectric material layer sandwiched between the first receiving electrode and the first drive electrode emits the ultrasonic waves in the first time period. In addition, the laminated structure of the second receiving electrode, the second drive electrode and a region of the piezoelectric material layer sandwiched between the second receiving electrode and the second drive electrode converts the ultrasonic waves into the electrical signals, and the second signal readout circuit can readout the electrical signals on the second receiving electrode electrically connected to the second signal readout circuit.

For example, in a second time period that does not overlap with the first time period in time, the second transistor M2 and the third transistor M3 included in the first signal readout circuit, and the first transistor M1 of the second signal readout circuit are turned on; the first transistor M1 of the first signal readout circuit, and the second transistor M2 and the third transistor M3 included in the second signal readout circuit are turned off. Correspondingly, the first drive electrode that is opposite to the first receiving electrode receives the first fixed voltage; the second drive electrode that is opposite to the second receiving electrode receives the drive voltage; in this case, the second fixed voltage may be applied to the second receiving electrode electrically connected to the second signal readout circuit, thereby the laminated structure of the second receiving electrode, the second drive electrode and the region of the piezoelectric material layer sandwiched between the second receiving electrode and the second drive electrode emits the ultrasonic waves in the second time period; in addition, the laminated structure of the first receiving electrode, the first drive electrode and the region of the piezoelectric material layer sandwiched between the first receiving electrode and the first drive electrode converts the ultrasonic waves into the electrical signals, and the first signal readout circuit can readout the electrical signals on the first receiving electrode electrically connected to the first signal readout circuit.

The fingerprint identification device provided by some embodiments of the present disclosure will be exemplarily illustrated with reference to the working process of fingerprint identification. For example, the processor applies the drive voltage to the first drive electrode and applies the fixed voltage to the first receiving electrode and the second drive electrode; in this case, the first drive electrode and the first receiving electrode together serve as an ultrasonic emitter, which drives the region of piezoelectric material layer corresponding to the first drive electrode to emit an ultrasonic wave, and the second drive electrode and the second receiving electrode together serve as an ultrasonic receiver, the second receiving electrode receives an electrical signal, which is obtained through converting, by the piezoelectric material layer, the ultrasonic wave reflected by the fingerprint to be detected. Because only part of the drive electrodes are used to emit the ultrasonic waves and the remaining drive electrodes and the receiving electrodes corresponding to the remaining drive electrodes are used to convert the ultrasonic waves, which are reflected by the fingerprint to be detected, into the electrical signals, only a part of a fingerprint image is obtained by the processor after the above-mentioned working process is completed; therefore, the processor further applies the drive voltage to the second drive electrodes, and apply the fixed voltage to the second receiving electrodes and the first drive electrodes; in this case, the second drive electrode and the second receiving electrode together serve as an ultrasonic emitter, which drives the region of the piezoelectric material layer corresponding to the second drive electrode to emit an ultrasonic wave, and the first drive electrode and the first receiving electrode together serve as an ultrasonic receiver, and the first receiving electrode receives an electrical signal, which is obtained through converting, by the piezoelectric material layer, the ultrasonic wave reflected by fingerprints to be detected. After this, the whole drive electrode layer is driven, and the processor (for example, the signal readout circuit of the driving circuit included in the processor) obtains the electrical signals of all receiving electrodes, and obtains the fingerprint image according to all the electrical signals.

According to the foregoing working process, in fingerprint identification device provided by some embodiments of the present disclosure, the electrodes for emitting ultrasonic waves are different from the electrodes for receiving ultrasonic waves, so the fingerprint identification device provided by some embodiments of the present disclosure can emit ultrasonic waves in real time and can receive ultrasonic waves in real time, for example, the fingerprint identification device can receive the ultrasonic waves reflected by fingerprints to be detected while emitting the ultrasonic waves.

Some embodiments of the present disclosure also provide a driving method of a fingerprint identification device, and the driving method is for driving the fingerprint identification device. The driving method of the fingerprint identification device provided by some embodiments of the present disclosure includes the following steps S1 and S2.

Step S1: applying a drive voltage and a fixed voltage (for example, a first fixed voltage) to the drive electrode layer simultaneously; and applying a fixed voltage (for example, a second fixed voltage) to the receiving electrode layer while acquiring the electrical signals output by the receiving electrode layer.

Step S2: obtaining a fingerprint image according to the electrical signals.

The driving method for driving the fingerprint identification device provided by some embodiments of the present disclosure is used to drive the fingerprint identification device provided by previous embodiments, and the implementation principle and implementation effect of the driving method are similar to those of the fingerprint identification device, so no further descriptions will be given here.

For example, the drive electrode layer includes a plurality of drive electrodes spaced apart from each other; the receiving electrode layer includes a plurality of receiving electrodes spaced apart from each other. For example, the step S1 includes: applying the first fixed voltage to the second part of the plurality of drive electrodes of the drive electrode layer while applying the drive voltage to the first part of the plurality of drive electrodes of the drive electrode layer, acquiring the electrical signals from receiving electrodes that are opposite to the second part of the plurality of drive electrodes while applying the second fixed voltage to receiving electrodes that are opposite to the first part of the plurality of drive electrodes. For example, the electrical signals on the receiving electrodes that are opposite to the second part of the plurality of drive electrodes may be sequentially acquired.

In some embodiments of the present disclosure, the drive electrode layer (for example, the plurality of drive electrodes included in the drive electrode layer) includes first drive electrodes and second drive electrodes, and the receiving electrode layer (for example, the plurality of receiving electrodes included in the receiving electrode layer) includes first receiving electrodes and second receiving electrodes.

The step S1 specifically includes: in a first time period, applying the drive voltage to the first drive electrodes; applying a fixed voltage (e.g., the second fixed voltage) to the first receiving electrodes to drive the piezoelectric material layer (e.g., the regions of the piezoelectric material layer corresponding to the first drive electrodes) to emit ultrasonic waves; and applying a fixed voltage (e.g., the first fixed voltage) to the second drive electrodes, to receive the electrical signals output by the second receiving electrodes; in a second time period, applying the drive voltage to the second drive electrodes; applying a fixed voltage (e.g., the second fixed voltage) to the second receiving electrodes to drive the piezoelectric material layer (e.g., the regions of the piezoelectric material layer corresponding to the second drive electrodes) to emit ultrasonic waves, and applying a fixed voltage (e.g., the first fixed voltage) to the first drive electrodes, to receive the electrical signals output by the first receiving electrodes.

For example, in the first time period, a first part of the plurality of drive electrodes correspond to the first drive electrodes, and a second part of the plurality of drive electrodes correspond to the second drive electrodes; in the second time period, the first part of the plurality of drive electrodes correspond to the second drive electrodes, and the second part of the plurality of drive electrodes correspond to the first drive electrodes.

For example, the second time period is later than the first time period. For example, the second time period and the first time period do not overlap in time.

For example, the first drive electrodes and the first receiving electrodes overlap in the direction perpendicular to the fingerprint identification device; the second drive electrodes and the second receiving electrodes overlap in the direction perpendicular to the fingerprint identification device. For example, in the direction perpendicular to the fingerprint identification device, the first drive electrodes cover (e.g., completely cover) the corresponding first receiving electrodes, and the second drive electrodes cover (e.g., completely cover) the corresponding second receiving electrodes.

For example, the plurality of receiving electrodes included in the receiving electrode layer are arranged in M rows and N columns, and both M and N are positive integers greater than 1; the receiving electrodes in odd columns are the first receiving electrodes, and the receiving electrodes in even columns are the second receiving electrodes. The plurality of drive electrodes included in the drive electrode layer are arranged in N columns (for example, 1 row N columns or M rows N columns); and the drive electrodes in odd columns are the first drive electrodes, and the drive electrodes in even columns are the second drive electrodes.

Figure 6A:
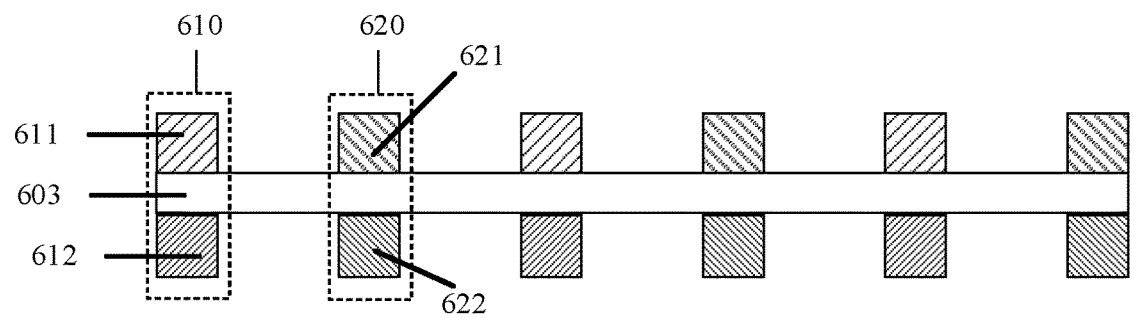
FIG. 6A is a schematic diagram of another fingerprint identification device provided by some embodiments of the present disclosure.
Figure 6B:
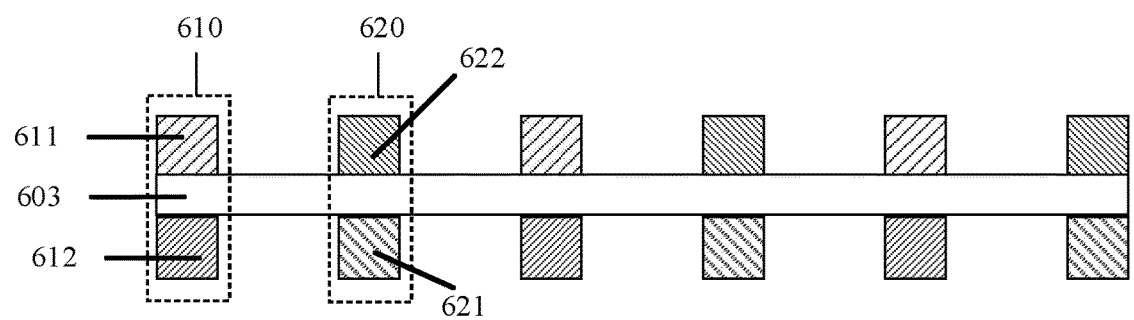
FIG. 6B is a schematic diagram of still another fingerprint identification device provided by some embodiments of the present disclosure.
Figure 6C:
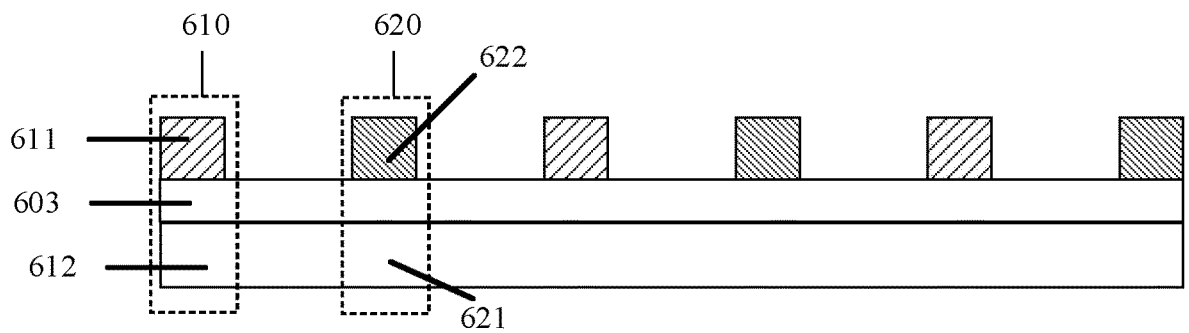
FIG. 6C is a schematic diagram of yet another fingerprint identification device provided by some embodiments of the present disclosure.

At least one embodiment of the present disclosure provides another fingerprint identification device, as illustrated in FIGS. 6A-6C, the fingerprint identification device includes a plurality of fingerprint identification units including a first part and a second part; the first part of the plurality of fingerprint identification units includes at least one fingerprint identification unit 610, and the second part of the plurality of fingerprint identification units includes at least one fingerprint identification unit 620; the fingerprint identification unit 610 of the first part of the plurality of fingerprint identification units is configured to emit ultrasonic waves in the first time period; the fingerprint identification unit 620 of the second part of the plurality of fingerprint identification units is configured to convert ultrasonic waves, which are emitted by the fingerprint identification unit 610 of the first part of the plurality of fingerprint identification units and reflected by a fingerprint to be detected, into electrical signals in the first time period; the fingerprint identification unit 620 of the second part of the plurality of fingerprint identification units is configured to emit the ultrasonic waves in the second time period that does not overlap with the first time period in time; the fingerprint identification unit 610 of the first part of the plurality of fingerprint identification units is configured to convert the ultrasonic waves, which are emitted by the fingerprint identification unit 620 of the second part of the plurality of fingerprint identification units and reflected by the fingerprint to be detected, into the electrical signals in the second time period.

For example, the fingerprint identification units 610 of the first part of the plurality of fingerprint identification units and the fingerprint identification units 620 of the second part of the plurality of fingerprint identification units are alternately arranged in the row direction.

For example, as illustrated in FIGS. 6A-6C, each fingerprint identification unit includes a first electrode 611 or 621, a second electrode 612 or 622, and a piezoelectric material 603 sandwiched between the first electrode 611 or 621 and the second electrode 621 or 623. For example, the first electrode 611 included in the fingerprint identification unit 610 of the first part of the plurality of fingerprint identification units is configured to receive the drive voltage in the first time period; the first electrode 621 included in the fingerprint identification unit 620 of the second part of the plurality of fingerprint identification units is configured to receive the first fixed voltage in the first time period; the second electrode 612 included in the fingerprint identification unit 610 of the first part of the plurality of fingerprint identification units is configured to receive the second fixed voltage in the first time period; the second electrode 622 included in the fingerprint identification unit 620 of the second part of the plurality of fingerprint identification units is configured to output the electrical signal in the first time period. For example, the first electrode 611 included in the fingerprint identification unit 610 of the first part of the plurality of fingerprint identification units is configured to receive the first fixed voltage in the second time period; the first electrode 621 included in the fingerprint identification unit 620 of the second part of the plurality of fingerprint identification units is configured to receive the drive voltage in the second time period; the second electrode 612 included in the fingerprint identification unit 610 of the first part of the plurality of fingerprint identification units is configured to output the electrical signals in the second time period; the second electrode 622 included in the fingerprint identification unit 620 of the second part of the plurality of fingerprint identification units is configured to receive the second fixed voltage in the second time period; the difference between the drive voltage and the second fixed voltage changes along with time.

For example, as illustrated in FIG. 6A, the first electrode 611 included in the fingerprint identification unit 610 of the first part of the plurality of fingerprint identification units and the first electrode 621 included in the fingerprint identification unit 620 of the second part of the plurality of fingerprint identification units are in a same electrode layer, and are spaced apart and electrically insulated from each other; The second electrode 612 included in the fingerprint identification unit 610 of the first part of the plurality of fingerprint identification units and the second electrode 622 included in the fingerprint identification unit 620 of the second part of the plurality of fingerprint identification units are in a same electrode layer, and are spaced apart and electrically insulated from each other.

For example, as illustrated in FIG. 6B, the first electrode 611 included in the fingerprint identification unit 610 of the first part of the plurality of fingerprint identification units and the second electrode 622 included in the fingerprint identification unit 620 of the second part of the plurality of fingerprint identification units are in a same electrode layer, and are spaced apart and electrically insulated from each other; the first electrode 621 included in the fingerprint identification unit 620 of the second part of the plurality of fingerprint identification units and the second electrode 612 included in the fingerprint identification unit 610 of the first part of the plurality of fingerprint identification units are in a same electrode layer and are electrically insulated from each other.

For example, as illustrated in FIG. 6C, the first electrode 611 included in the fingerprint identification unit 610 of the first part of the plurality of fingerprint identification units and the second electrode 622 included in the fingerprint identification unit 620 of the second part of the plurality of fingerprint identification units are in a same electrode layer, and are spaced apart and electrically insulated from each other; The first electrode 621 included in the fingerprint identification unit 620 of the second part of the plurality of fingerprint identification units and the second electrode 612 included in the fingerprint identification unit 610 of the first part of the plurality of fingerprint identification units are in a same electrode layer and are electrically connected to each other. For example, the first electrode 621 included in the fingerprint identification unit 620 of the second part of the plurality of fingerprint identification units and the second electrode 612 included in the fingerprint identification unit 610 of the first part of the plurality of fingerprint identification units are all located in a same planar electrode.

At least one embodiment of the present disclosure also provides a driving method for driving another fingerprint identification device provided by any embodiment of the present disclosure, the driving method includes: driving the first part of the plurality of fingerprint identification units to emit the ultrasonic waves in the first time period; driving the second part of the plurality of fingerprint identification units to convert the ultrasonic waves, which are emitted by the first part of the plurality of fingerprint identification units and reflected by the fingerprint to be detected, into the electrical signals in the first time period, to acquire the electrical signals; driving the second part of the plurality of fingerprint identification units to emit the ultrasonic waves in the second time period; and driving the first part of the plurality of fingerprint identification units to convert the ultrasonic waves, which are emitted by the second part of the plurality of fingerprint identification units and reflected by the fingerprint to be detected, into the electrical signals in the second time period, to acquire the electrical signals.

For example, the driving the first part of the plurality of fingerprint identification units to emit the ultrasonic waves in the first time period, includes: in the first time period, applying a drive voltage to the first electrodes included in the first part of the plurality of fingerprint identification units, and applying a second fixed voltage to the second electrodes included in the first part of the plurality of fingerprint identification units, and making the difference between the drive voltage and the second fixed voltage to change along with time. The driving the second part of the plurality of fingerprint identification units to convert the ultrasonic waves, which are emitted by the first part of the plurality of fingerprint identification units and reflected by the fingerprint to be detected, into the electrical signals in the first time period to acquire the electrical signals, includes: in the first time period, applying the first fixed voltage to the first electrodes included in the second part of the plurality of fingerprint identification units and acquiring the electrical signals from the second electrodes included in the second part of the plurality of fingerprint identification units. The driving the second part of the fingerprint identification units to emit the ultrasonic waves in the second time period, includes: in the second time period, applying the drive voltage to the first electrodes included in the second part of the fingerprint identification units, and applying the second fixed voltage to the second electrodes included in the second part of the fingerprint identification units, and making the difference between the drive voltage and the second fixed voltage to change along with time. The driving the first part of the plurality of fingerprint identification units to convert the ultrasonic waves, which are emitted by the second part of the plurality of fingerprint identification units and reflected by the fingerprint to be detected, into the electrical signals in the second time period to acquire the electrical signals, includes: in the second time period, applying the first fixed voltage to the first electrodes included in the first part of the plurality of fingerprint identification units and acquiring the electrical signals from the second electrodes included in the first part of the plurality of fingerprint identification units.

Figure 8:
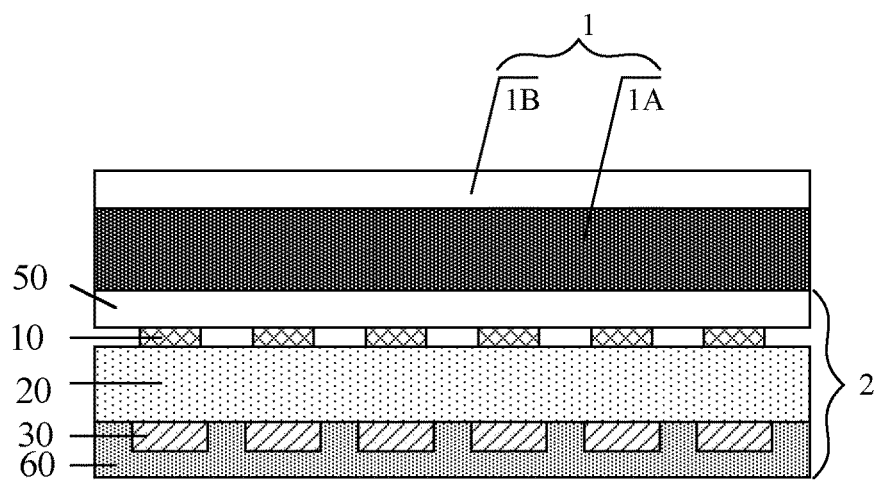
FIG. 8 is a schematically structural diagram of a display device provided by some embodiments of the present disclosure.

Some embodiments of this disclosure also provide a display device. FIG. 8 is a schematically structural diagram of the display device provided by some embodiments of the present disclosure. As illustrated in FIG. 8, the display device provided by embodiments of the present disclosure includes a display panel 1 and a fingerprint identification device 2. The display panel 1 and the fingerprint identification device 2 are stacked in a direction perpendicular to the illustrated display device.

In some examples, the row direction of the fingerprint identification device 2 corresponds to an extension direction of gate lines of the display panel 1. In other examples, the row direction of the fingerprint identification device 2 corresponds to an extension direction of data lines of the display panel 1.

For example, the fingerprint identification device 2 is located on one side of the display panel 1. For example, the area of the fingerprint identification device 2 is equal to the area of the display region of the display panel 1.

For example, the one side of the display panel may refer to a display side (e.g., a light-emitting side) of the display panel or an opposite side of the display panel (e.g., a non-light emitting side of the display panel or the side of the display panel that is opposite to light-emitting side).

For example, the display panel may include an organic light-emitting diode (OLED) display panel or a liquid crystal display (LCD) display panel. It should be noted that FIG. 8 is illustrated by taking an OLED display panel as an example.

In the case where the display panel is an OLED display panel, because the OLED display panel adopts a self-luminous mode, the fingerprint identification device can be arranged on a side that is opposite to the display side of the OLED display panel, and in this case, the substrate serves as a surface for contacting the display panel. Even if the fingerprint identification device is arranged below the display region of the OLED display panel, the detection signal can pass through the OLED display panel due to that ultrasonic waves are adopted in fingerprint identification, and thus the display effect is not affected, and changes in the display content of the display panel does not affect the emission and reception of the ultrasonic signals. In the case where the display panel is an LCD display panel, the fingerprint identification device is located on the display side of the display panel, and in this case, the substrate serves as a surface for contacting the fingerprint.

For example, the OLED display panel includes an OLED array substrate 1A and a cover plate 1B, the OLED array substrate 1A includes a plurality of pixel units, each pixel unit includes a thin film transistor and an OLED light-emitting device, the OLED light-emitting device includes an anode, a cathode and an organic light-emitting layer arranged between the cathode and the anode. An encapsulation adhesive is arranged between the OLED array substrate 1A and the cover plate 1B, so as to seal the OLED light emitting devices on the OLED array substrate in an enclosed environment.

For example, as illustrated in FIG. 8, the display panel 1 is located on a side of the receiving electrode layer 10 away from the piezoelectric material layer 20.

For example, the cover plate 1B is a flexible cover plate, which can realize flexible folding of the display panel. For example, the thickness of the cover plate 1B is less than or equal to 100 microns.

The area of the fingerprint identification device 2 in some embodiments of the present disclosure is equal to the area of the display region of the display panel 1, to realize full-screen fingerprint identification. For example, in the case where the display panel 1 further includes a periphery region surrounding the display region, the area of the fingerprint identification device 2 may be larger than that of the display region of the display panel 1. For example, the area of the fingerprint identification device 2 mentioned above refers to the area of the surface, parallel to the display surface of the display device, of the fingerprint identification device 2; the area of the display panel 1 refers to the area of the surface, parallel to the display surface of the display device, of the display panel 1.

For example, the display device further includes an optical glue (not shown in the figures) for adhering the display panel 1 and the fingerprint identification device 2.

For example, the display device can be any product or component with display function, such as mobile phone, tablet computer, television, monitor, notebook computer, digital photo frame, navigator, etc. . . . Other essential components of the display device should be understood by those skilled in the art, no further descriptions will be given here, it should not be construed as a limitation on the embodiments of the present disclosure.

For example, the fingerprint identification device 2 is the fingerprint identification device provided by the previous embodiments, and implementation principle and implementation effect of the fingerprint identification device 2 are similar, and no further descriptions will be given here.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. A fingerprint identification device, comprising: a receiving electrode layer, a piezoelectric material layer, and a drive electrode layer,
   wherein the piezoelectric material layer is between the receiving electrode layer and the drive electrode layer;
   the piezoelectric material layer is configured to emit ultrasonic waves under an excitation of at least a drive voltage, and is further configured to convert ultrasonic waves, which are emitted by the piezoelectric material layer and reflected by a fingerprint to be detected, into electrical signals;
   the drive electrode layer is configured to receive the drive voltage and a first fixed voltage simultaneously, and the receiving electrode layer is configured to output the electrical signals while receiving a second fixed voltage;
   the electrical signals are used for obtaining a fingerprint image;
   the drive electrode layer comprises a plurality of drive electrodes spaced apart from each other;
   the receiving electrode layer comprises a plurality of receiving electrodes spaced apart from each other;
   a first part of the plurality of drive electrodes in the drive electrode layer is configured to receive the drive voltage in operation;
   a second part of the plurality of drive electrodes in the drive electrode layer is configured to receive the first fixed voltage in operation;
   receiving electrodes that are opposite to the first part of the plurality of drive electrodes are configured to receive the second fixed voltage in operation;
   regions of the piezoelectric material layer that are opposite to the first part of the plurality of drive electrodes are configured to emit the ultrasonic waves under the excitation of at least the drive voltage in operation; and
   regions of the piezoelectric material layer that are opposite to the second part of the plurality of drive electrodes are configured to convert the ultrasonic waves, which are emitted by the regions of the piezoelectric material layer that are opposite to the first part of the plurality of drive electrodes and reflected by the fingerprint to be detected, into the electrical signals in operation.

2. The fingerprint identification device according to claim 1, wherein a difference between the drive voltage and the second fixed voltage is configured to change along with time.

3. The fingerprint identification device according to claim 2, further comprising a driving circuit, a signal readout circuit, and a processor,
   wherein the driving circuit is configured to be connected to the drive electrode layer electrically so as to apply the drive voltage to the first part of the plurality of drive electrodes in the drive electrode layer and apply the first fixed voltage to the second part of the plurality of drive electrodes in the drive electrode layer;
   the signal readout circuit is configured to be connected to the receiving electrode layer electrically so as to apply the second fixed voltage to the receiving electrodes that are opposite to the first part of the plurality of drive electrodes and acquire the electrical signals from the receiving electrodes that are opposite to the second part of the plurality of drive electrodes;
   the driving circuit and the signal readout circuit are jointly configured to enable the difference between the drive voltage and the second fixed voltage to change along with time; and
   the processor is configured to obtain the fingerprint image according to the electrical signals.

4. The fingerprint identification device according to claim 3, wherein the plurality of receiving electrodes in the receiving electrode layer are arranged in M rows and N columns, and M and N are positive integers greater than 1;
   the plurality of receiving electrodes comprise first receiving electrodes and second receiving electrodes;

receiving electrodes in odd columns are the first receiving electrodes, and receiving electrodes in even columns are the second receiving electrodes; and the driving circuit and the signal readout circuit are jointly configured to apply the second fixed voltage to all the second receiving electrodes while acquiring the electrical signals output by all the first receiving electrodes, or to apply the second fixed voltage to all the first receiving electrodes while acquiring the electrical signals output by all the second receiving electrodes.

5. The fingerprint identification device according to claim 4, wherein the plurality of drive electrodes in the drive electrode layer are arranged in one row and N columns;

the plurality of drive electrodes comprise first drive electrodes and second drive electrodes;

each drive electrode in the plurality of drive electrodes is a strip-shaped electrode;

drive electrodes in odd columns are the first drive electrodes, and drive electrodes in even columns are the second drive electrodes; and an orthographic projection of an i-th column of drive electrode on the piezoelectric material layer covers an orthographic projection of an i-th column of receiving electrodes on the piezoelectric material layer, and $1 \leq i \leq N$.

6. The fingerprint identification device according to claim 5, wherein all the first drive electrodes are connected to each other, and all the second drive electrodes are connected to each other.

7. The fingerprint identification device according to claim 3, further comprising a substrate, wherein the substrate is at a side of the receiving electrode layer away from the piezoelectric material layer;

the substrate comprises a base layer and a plurality of signal readout circuits;

the base layer is at a side of the plurality of signal readout circuits away from the plurality of receiving electrodes; and the plurality of signal readout circuits are respectively connected to the plurality of receiving electrodes in the receiving electrode layer, electrically.

8. The fingerprint identification device according to claim 4, wherein the plurality of drive electrodes in the drive electrode layer are in M rows and N columns;

the plurality of drive electrodes comprise first drive electrodes and second drive electrodes;

drive electrodes in odd columns are the first drive electrodes, and drive electrodes in even columns are the second drive electrodes; and an orthographic projection of a drive electrode in an i-th row and j-th column on the piezoelectric material layer covers an orthographic projection of a receiving electrode in an i-th row and a j-th column on the piezoelectric material layer, and $1 \leq j \leq M$ and $1 \leq j \leq N$.

9. The fingerprint identification device according to claim 5, wherein the driving circuit is further configured to apply the first fixed voltage to all the second drive electrodes while applying the drive voltage to all the first drive electrodes, or to apply the first fixed voltage to all the first drive electrodes while applying the drive voltage to all the second drive electrodes; and the signal readout circuit is further configured to apply the second fixed voltage to all the first receiving electrodes in a case where the driving circuit is further configured to apply the drive voltage to all the first drive electrodes, and the signal readout circuit is further configured to apply the second fixed voltage to all the second receiving electrodes in a case where the driving circuit is further configured to apply the drive voltage to all the second drive electrodes.

10. A display device, comprising the fingerprint identification device according to claim 1, and a display panel; and the display panel and the fingerprint identification device are stacked in a direction perpendicular to the display device.

11. The display device according to claim 10, wherein the fingerprint identification device is on a non-light emitting side of the display panel;

the display panel is at a side of the receiving electrode layer away from the piezoelectric material layer; and an area of the fingerprint identification device is greater than or equal to an area of a display area of the display panel.

12. A driving method for driving the fingerprint identification device according to claim 1, comprising:

applying the drive voltage and the first fixed voltage to the drive electrode layer simultaneously;

applying the second fixed voltage to the receiving electrode layer while acquiring the electrical signals output by the receiving electrode layer; and obtaining the fingerprint image according to the electrical signals.

13. The driving method according to claim 12, wherein the drive electrode layer comprises the plurality of drive electrodes spaced apart from each other, and the receiving electrode layer comprises the plurality of receiving electrodes spaced apart from each other;

the applying the drive voltage and the first fixed voltage to the drive electrode layer simultaneously, and applying the second fixed voltage to the receiving electrode layer while acquiring the electrical signals output by the receiving electrode layer, comprises:

applying the first fixed voltage to the second part of the plurality of drive electrodes of the drive electrode layer while applying the drive voltage to the first part of the plurality of drive electrodes of the drive electrode layer, acquiring the electrical signals from the receiving electrode that is opposite to the second part of the plurality of drive electrodes while applying the second fixed voltage to the receiving electrode that is opposite to the first part of the plurality of drive electrodes; and a difference between the drive voltage and the second fixed voltage changing with time.

14. The driving method according to claim 13, wherein the plurality of drive electrodes in the drive electrode layer comprises first drive electrodes and second drive electrodes;

the plurality of receiving electrodes in the receiving electrode layer comprises first receiving electrodes and second receiving electrodes;

the first drive electrodes and the first receiving electrodes overlap in a direction perpendicular to the fingerprint identification device;

the second drive electrodes and the second receiving electrodes overlap in a direction perpendicular to the fingerprint identification device; and the applying the first fixed voltage to the second part of the plurality of drive electrodes of the drive electrode layer while applying the drive voltage to the first part of the plurality of drive electrodes of the drive electrode layer, acquiring the electrical signals from the receiving electrode that is opposite to the second part of the plurality of drive electrodes while applying the second fixed voltage to the receiving electrode that is opposite to the first part of the plurality of drive electrodes, comprises:

in a first time period, applying the drive voltage to the first drive electrodes, applying the second fixed voltage to the first receiving electrodes to drive the piezoelectric material layer to emit the ultrasonic waves, and applying the first fixed voltage to the second drive electrodes to receive the electrical signals output by the second receiving electrodes;

in a second time period, applying the drive voltage to the second drive electrodes, applying the second fixed voltage to the second receiving electrodes to drive the piezoelectric material layer to emit the ultrasonic waves, and applying the first fixed voltage to the first drive electrodes to receive the electrical signals output by the first receiving electrodes; and the second time period being delayed from the first time period.

15. A fingerprint identification device, comprising a plurality of fingerprint identification units, wherein the plurality of fingerprint identification unit comprise a first part and a second part which are not overlapped in a direction perpendicular to the fingerprint identification device;

the first part of the plurality of fingerprint identification units is configured to emit ultrasonic waves in a first time period;

the second part of the plurality of fingerprint identification units is configured to convert ultrasonic waves, which are emitted by the first part of the plurality of fingerprint identification units and reflected by a fingerprint to be detected, into electrical signals in the first time period;

the second part of the plurality of fingerprint identification units is configured to emit the ultrasonic waves in a second time period that does not overlap with the first time period in time; and the first part of the plurality of fingerprint identification units is configured to convert ultrasonic waves, which are emitted by the second part of the plurality of fingerprint identification units and reflected by the fingerprint to be detected, into the electrical signals in the second time period.

16. The fingerprint identification device according to claim 15, wherein each of the plurality of fingerprint identification units comprises a first electrode, a second electrode, and a piezoelectric material sandwiched between the first electrode and the second electrode;

first electrodes in the first part of the plurality of fingerprint identification units are configured to receive a drive voltage in the first time period;

first electrodes in the second part of the plurality of fingerprint identification units are configured to receive a first fixed voltage in the first time period;

second electrodes in the first part of the plurality of fingerprint identification units are configured to receive a second fixed voltage in the first time period;

second electrodes in the second part of the plurality of fingerprint identification units are configured to output the electrical signals in the first time period;

the first electrodes in the first part of the plurality of fingerprint identification units are configured to receive the first fixed voltage in the second time period;

the first electrodes in the second part of the plurality of fingerprint identification units are configured to receive the drive voltage in the second time period;

the second electrodes in the first part of the plurality of fingerprint identification units are configured to output the electrical signals in the second time period;

the second electrodes in the second part of the plurality of fingerprint identification units are configured to receive the second fixed voltage during the second time period; and a difference between the drive voltage and the second fixed voltage changes along with time.

17. The fingerprint identification device according to claim 16, wherein the first electrodes in the first part of the plurality of fingerprint identification units and the first electrodes in the second part of the plurality of fingerprint identification units are in a same electrode layer, and are spaced apart and electrically insulated from each other; and the second electrodes in the first part of the plurality of fingerprint identification units and the second electrodes in the second part of the plurality of fingerprint identification units are in a same electrode layer, and are spaced apart and electrically insulated from each other.

18. The fingerprint identification device according to claim 16, wherein the first electrodes in the first part of the plurality of fingerprint identification units and the second electrodes in the second part of the plurality of fingerprint identification units are in a same electrode layer, and are spaced apart and electrically insulated from each other; and the first electrodes in the second part of the plurality of fingerprint identification units and the second electrodes in the first part of the plurality of fingerprint identification units are in a same electrode layer and are electrically connected or electrically insulated from each other.

19. A driving method for driving the fingerprint identification device according to claim 15, comprising:

driving the first part of the plurality of fingerprint identification units to emit the ultrasonic waves in the first time period;

driving the second part of the plurality of fingerprint identification units to convert the ultrasonic waves, which are emitted by the first part of the plurality of fingerprint identification units and reflected by the fingerprint to be detected, into the electrical signals in the first time period to acquire the electrical signals;

driving the second part of the plurality of fingerprint identification units to emit the ultrasonic waves in the second time period; and driving the first part of the plurality of fingerprint identification units to convert the ultrasonic waves, which are emitted by the second part of the plurality of fingerprint identification units and reflected by the fingerprint to be detected, into the electrical signals in the second time period to acquire the electrical signals.

20. The driving method according to claim 19, wherein the driving the first part of the plurality of fingerprint identification units to emit the ultrasonic waves in the first time period, comprises:

in the first time period, applying a drive voltage to first electrodes in the first part of the plurality of fingerprint identification units, and applying a second fixed voltage to second electrodes in the first part of the plurality of fingerprint identification units, and making a difference between the drive voltage and the second fixed voltage change along with time;

the driving the second part of the plurality of fingerprint identification units to convert the ultrasonic waves, which are emitted by the first part of the plurality of fingerprint identification units and reflected by the fingerprint to be detected, into the electrical signals in the first time period to acquire the electrical signals, comprises:

in the first time period, applying a first fixed voltage to first electrodes in the second part of the plurality of fingerprint identification units and acquiring the electrical signals from second electrodes in the second part of the plurality of fingerprint identification units;

the driving the second part of the fingerprint identification units to emit the ultrasonic waves in the second time period, comprises:

in the second time period, applying the drive voltage to the first electrodes in the second part of the fingerprint identification units, and applying the second fixed voltage to the second electrodes in the second part of the fingerprint identification units, and making the difference between the drive voltage and the second fixed voltage change along with time;

the driving the first part of the plurality of fingerprint identification units to convert the ultrasonic waves, which are emitted by the second part of the plurality of fingerprint identification units and reflected by the fingerprint to be detected, into the electrical signals in the second time period to acquire the electrical signals, comprises:

in the second time period, applying the first fixed voltage to the first electrodes in the first part of the plurality of fingerprint identification units and acquiring the electrical signals from the second electrodes in the first part of the plurality of fingerprint identification units.

\* \* \* \* \*